United States Patent
Suwa et al.

(10) Patent No.: US 10,369,479 B2
(45) Date of Patent: Aug. 6, 2019

(54) INFORMATION PROCESSING APPARATUS, CONTROL DATA TRANSMISSION METHOD AND INFORMATION PROCESSING SYSTEM

(71) Applicant: Sony Interactive Entertainment Inc., Tokyo (JP)

(72) Inventors: Yoshihiko Suwa, Kanagawa (JP); Yoshiyuki Imada, Chiba (JP); Shigetaka Kudo, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 104 days.

(21) Appl. No.: 15/500,764

(22) PCT Filed: Aug. 12, 2015

(86) PCT No.: PCT/JP2015/072871
§ 371 (c)(1),
(2) Date: Jan. 31, 2017

(87) PCT Pub. No.: WO2016/027746
PCT Pub. Date: Feb. 25, 2016

(65) Prior Publication Data
US 2017/0225082 A1    Aug. 10, 2017

(30) Foreign Application Priority Data
Aug. 19, 2014   (JP) .................. 2014-166690

(51) Int. Cl.
*A63F 13/34*    (2014.01)
*A63F 13/85*    (2014.01)
(Continued)

(52) U.S. Cl.
CPC .............. *A63F 13/85* (2014.09); *A63F 13/30* (2014.09); *A63F 13/34* (2014.09); *A63F 13/79* (2014.09);
(Continued)

(58) Field of Classification Search
CPC ........... A63F 13/85; A63F 13/30; A63F 13/79
(Continued)

(56) References Cited

U.S. PATENT DOCUMENTS

| 9,004,998 B2 | 4/2015 | Coulson | |
|---|---|---|---|
| 2007/0197289 A1* | 8/2007 | Fujimoto | A63F 13/10 463/32 |

(Continued)

FOREIGN PATENT DOCUMENTS

| EP | 2405626 A1 | 1/2012 |
|---|---|---|
| JP | 2011005306 A | 1/2011 |

(Continued)

OTHER PUBLICATIONS

Extended Search Report for corresponding EP Application No. 15834518.1, 9 pages, dated Feb. 15, 2018.

(Continued)

*Primary Examiner* — David L Lewis
*Assistant Examiner* — Shauna-Kay Hall
(74) *Attorney, Agent, or Firm* — Matthew B. Dernier, Esq.

(57) ABSTRACT

A content execution unit executes a game program, and a sharing processing unit manages the control right of a content. A distribution processing unit transmits content image data to a different information processing apparatus. The sharing processing unit includes an information acquisition unit acquiring operation information of a controller from the different information processing apparatus, an operation data provision unit providing the acquired operation information to the game program, a control data acquisition unit acquiring control data for a control target unit of the controller from the game program, and a control data provision unit providing the control data to a controller of the different information processing apparatus.

6 Claims, 27 Drawing Sheets

(51) Int. Cl.
| | |
|---|---|
| *G06F 13/00* | (2006.01) |
| *H04N 21/4788* | (2011.01) |
| *A63F 13/30* | (2014.01) |
| *A63F 13/79* | (2014.01) |
| *H04L 29/06* | (2006.01) |
| *H04N 21/2187* | (2011.01) |
| *H04L 29/08* | (2006.01) |

(52) U.S. Cl.
CPC .............. *G06F 13/00* (2013.01); *H04L 67/38* (2013.01); *H04N 21/2187* (2013.01); *H04N 21/4788* (2013.01); *H04L 67/02* (2013.01)

(58) Field of Classification Search
USPC .......................................................... 463/40
See application file for complete search history.

(56) References Cited

U.S. PATENT DOCUMENTS

| | | | | |
|---|---|---|---|---|
| 2010/0285858 | A1* | 11/2010 | Clowes | G07F 17/3272 463/9 |
| 2011/0118033 | A1* | 5/2011 | Fiedler | A63F 13/85 463/42 |
| 2011/0195790 | A1 | 8/2011 | Konkle | |
| 2011/0307807 | A1 | 12/2011 | Norby | |
| 2012/0075405 | A1* | 3/2012 | Sakai | H04N 7/15 348/14.01 |
| 2012/0162254 | A1 | 6/2012 | Anderson | |
| 2013/0084985 | A1* | 4/2013 | Green | A63F 9/24 463/40 |
| 2013/0190062 | A1 | 7/2013 | Coulson | |
| 2014/0349753 | A1* | 11/2014 | Imai | A63F 13/10 463/31 |
| 2017/0216721 | A1* | 8/2017 | Nomura | G06F 13/00 |

FOREIGN PATENT DOCUMENTS

| | | |
|---|---|---|
| JP | 2012034793 A | 2/2012 |
| JP | 2014121610 A | 7/2014 |
| JP | 2014517746 A | 7/2014 |
| WO | 2012177236 A1 | 12/2012 |
| WO | 2013111247 A1 | 8/2013 |
| WO | 2014100770 A2 | 6/2014 |

OTHER PUBLICATIONS

International Search Report for corresponding PCT Application No. PCT/JP2015/072871, 2 pages, dated Nov. 2, 2015.
International Preliminary Report on Patentability and Written Opinion for corresponding PCT Application No. PCT/JP2015/072871, 15 pages, dated Mar. 2, 2017.
Notice of Cancellation of Reconsideration by Examiner before Appeal for corresponding JP Application No. 2014166690, 3 pages, dated Aug. 7, 2018.
Prelminary Report for corresponding JP Application No. 2014166690, 6 pages, dated Jul. 31, 2018.

* cited by examiner

FIG.2
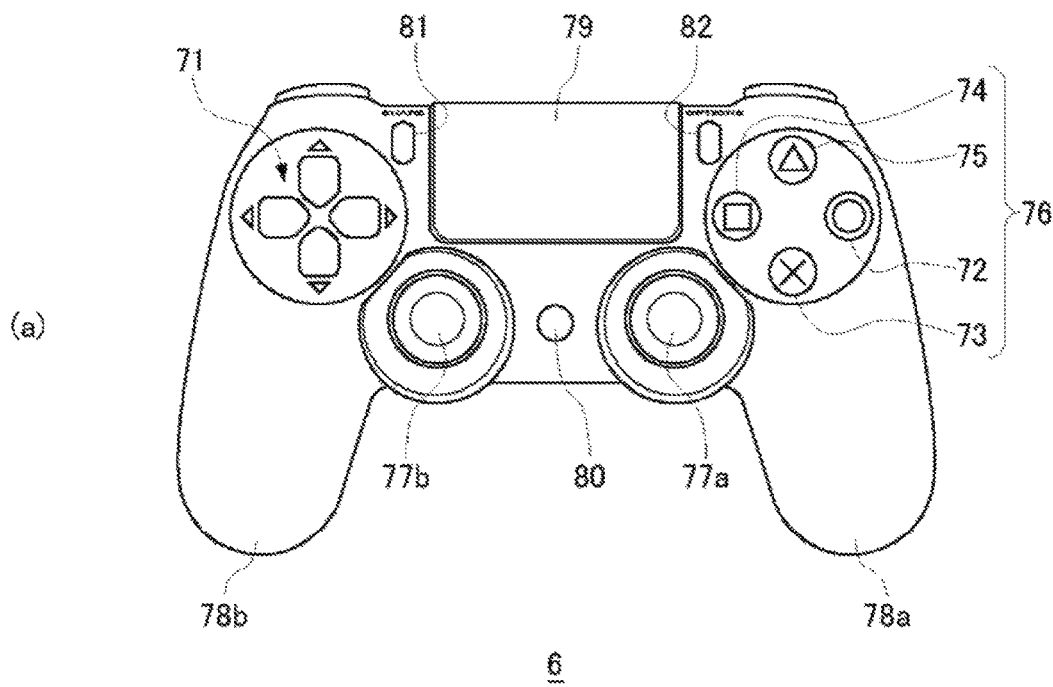
(a)
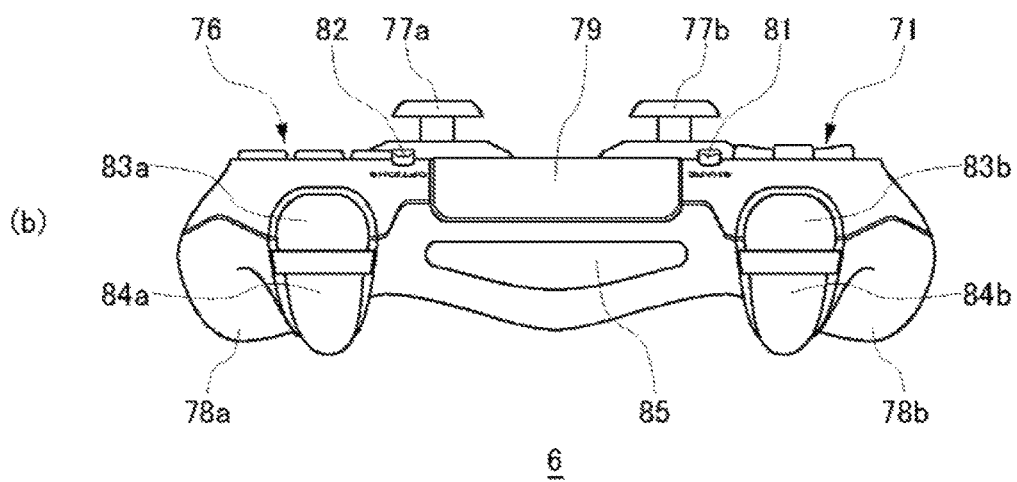
(b)

FIG. 13

WHAT IS SHARE PLAY?

IF SHARE PLAY IS USED, THEN TWO PLAYERS PARTICIPATING IN THE SAME CHAT CAN PLAY A GAME IN SUCH A MANNER THEY FEEL AS IF THEY WERE IN THE SAME ROOM. IN ORDER TO USE THE SHARE PLAY, YOU WILL BEGIN SHARE PLAY AS A HOST OR PARTICIPATE IN SHARE PLAY AS A GUEST. THE GUEST CAN VIEW A GAME SCREEN IMAGE OF THE HOST OR CAN PLAY A GAME IN PLACE OF THE HOST. IN A GAME READY FOR LOCAL MATCH PLAY, ALSO IT IS POSSIBLE FOR THE HOST AND THE GUEST TO PLAY THE SAME GAME TOGETHER.

OK

⊗ RETURN   ⊙ DETERMINE

4a

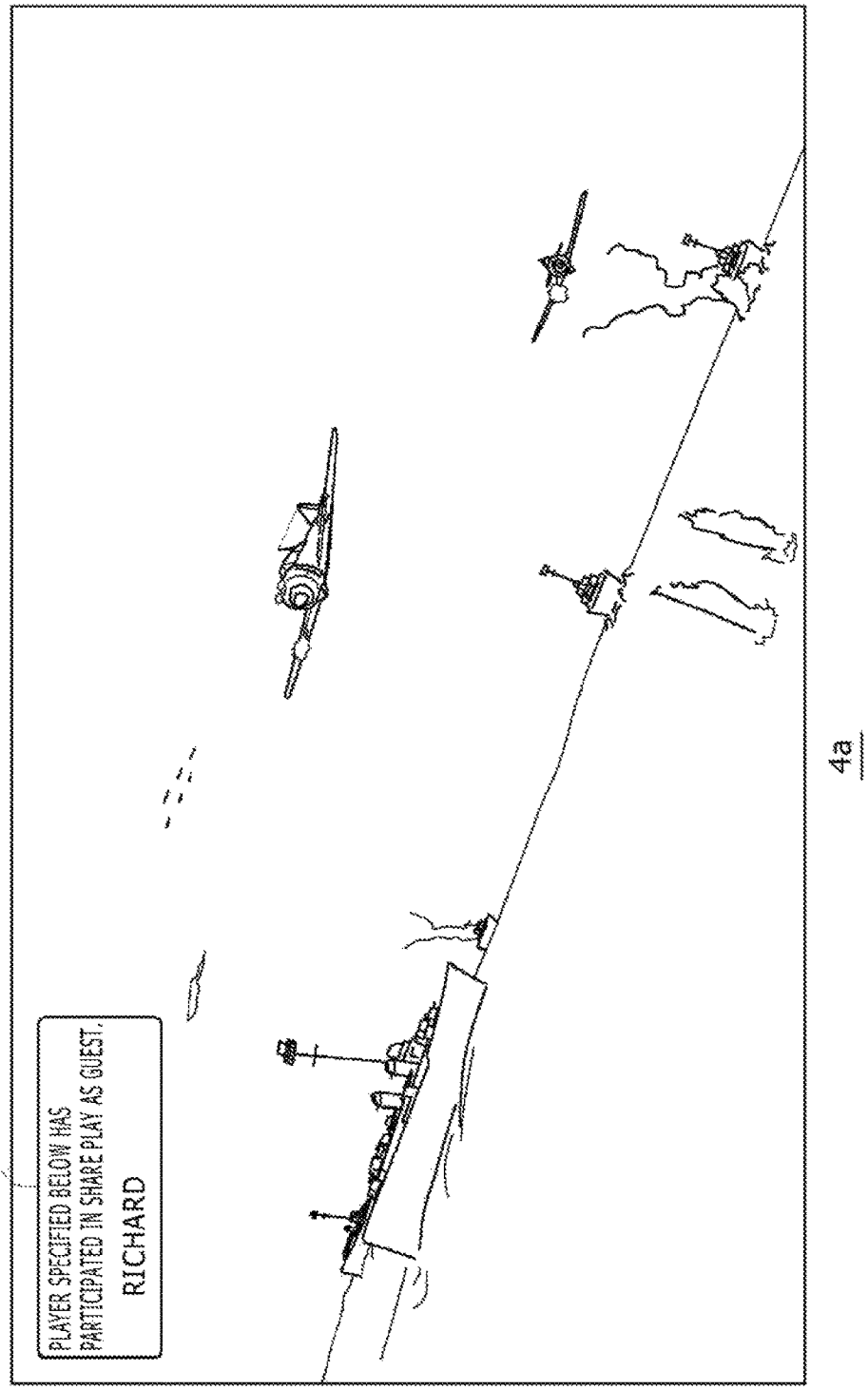

F I G . 2 1
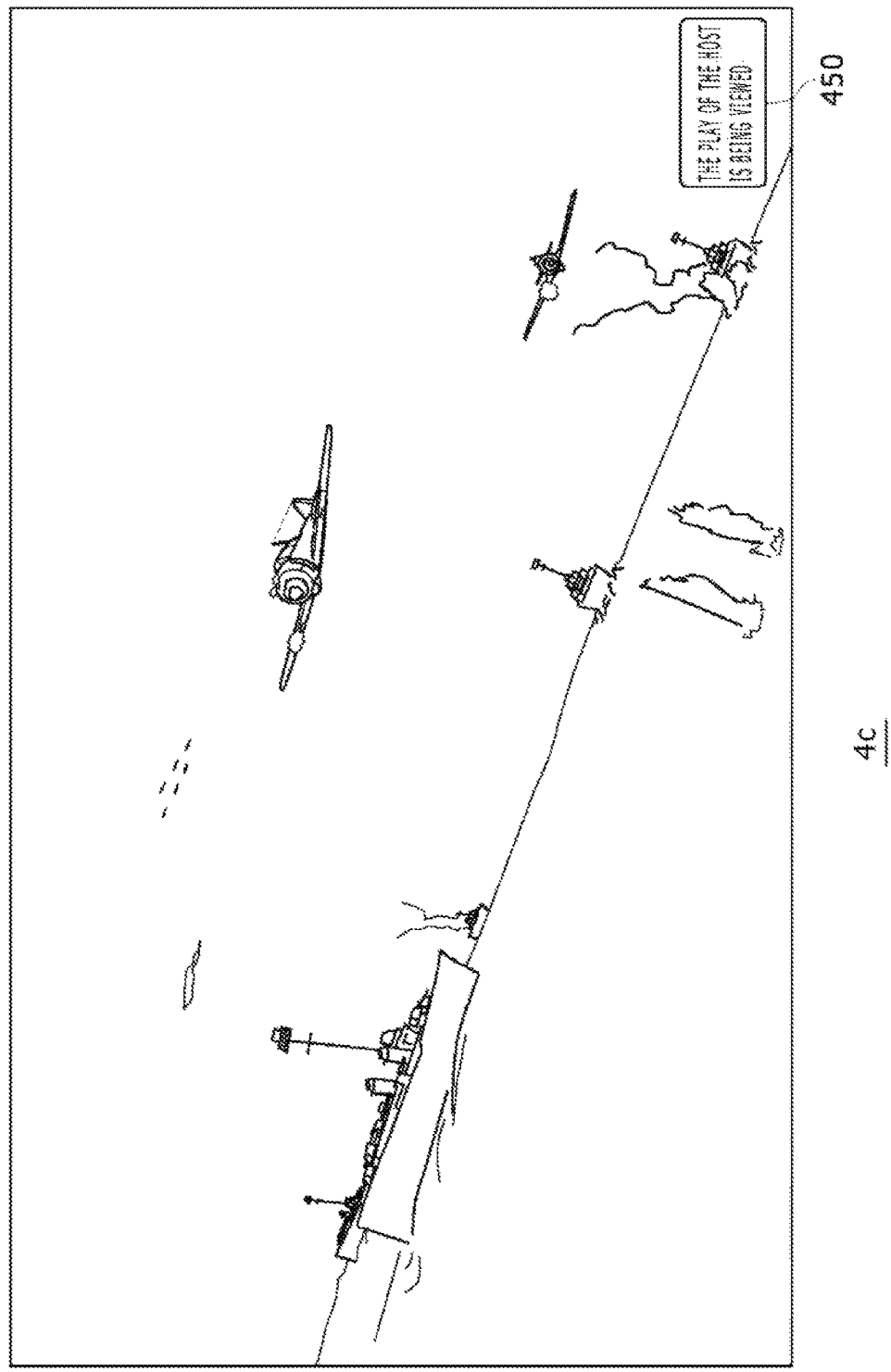

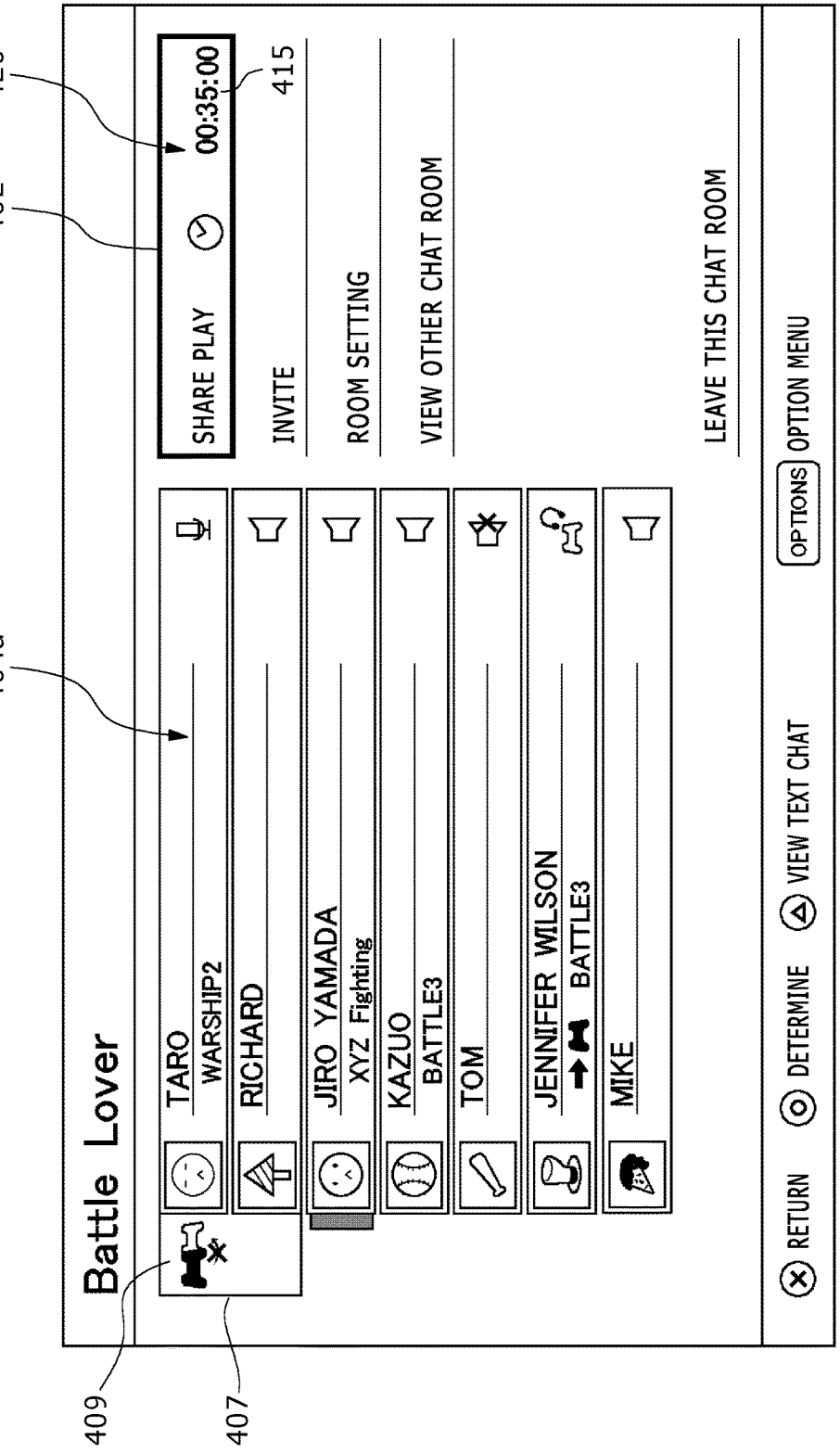

INFORMATION PROCESSING APPARATUS, CONTROL DATA TRANSMISSION METHOD AND INFORMATION PROCESSING SYSTEM

TECHNICAL FIELD

The present invention relates to an information processing technology for distributing a content image which is being executed to share the content image between a plurality of users.

BACKGROUND ART

In recent years, a service by which a moving image created or captured by a user is made public has become popular. Also it has become possible to couple terminals of users by peer-to-peer (P2P) connection so that the users can communicate directly with each other. The users can utilize such a mechanism as just described to exchange various data with other users through the Internet.

Further, an environment in which a plurality of users play a game together through the Internet has been created, and such a network service of a game as just described has already become a role as a communication tool. PTL 1 proposes a game distribution system wherein a game apparatus of a distribution source can distribute information relating to a play situation of a game to a game apparatus of a reception side and a user of the reception side can take part in the game being executed by the game apparatus of the distribution source.

CITATION LIST

Patent Literature

[PTL 1] Japanese Patent Laid-Open No. 2012-34793

SUMMARY

Technical Problem

The inventor of the present invention has paid attention to the possibility of a technology for sharing a content image such as a game image by a plurality of users. If an image of a game being played by a host user is simultaneously viewed by a guest user or users, then the plurality of users can enjoy the same game image even if they are at remote places from each other.

When such a content image as described above is to be shared, preferably a system can provide various sharing modes such that needs by the host user side and the needs by the guest user side are satisfied. That various sharing modes can be provided increases the usefulness of the system, and by preparing a mechanism in accordance with a situation of a host user or a guest user in each of the various sharing modes, the value of the system is raised.

Therefore, it is an object of the present invention to provide a technology which effectively implements sharing of a content image.

Solution to Problem

In order to solve the problem described above, the information processing apparatus of a certain aspect of the present invention is an information processing apparatus operated by a first apparatus used by a first user and connected to a different information processing apparatus, which is operated by a second apparatus used by a second user, through a network, including an execution unit configured to execute a content, a sharing processing unit, and a distribution processing unit configured to transmit content image data to the different information processing apparatus operated by the second user. The sharing processing unit includes an information acquisition unit configured to acquire operation information of the second apparatus from the different information processing apparatus, an operation data provision unit configured to provide the acquired operation information of the second apparatus to the content executed by the execution unit, a control data acquisition unit configured to acquire control data for a control target unit of an apparatus from the content executed by the execution unit, and a control data provision unit configured to provide the control data to the second apparatus.

Another aspect of the present invention is an information processing system in which a first information processing apparatus which is operated by a first apparatus used by a first user and a second information processing apparatus which is operated by a second apparatus used by a second user are connected to each other through a network. The first information processing apparatus includes an execution unit configured to execute a content, a sharing processing unit, and a distribution processing unit configured to transmit content image data to the second information processing apparatus. The second information processing apparatus includes an image data acquisition unit configured to acquire content image data, a reproduction processing unit configured to reproduce a content image using the acquired content image data, and an operation data transmission unit configured to transmit operation information of the second apparatus to the first information processing apparatus. The sharing processing unit includes an information acquisition unit configured to acquire operation information of the second apparatus from the second information processing apparatus, an operation data provision unit configured to provide the acquired operation information of the second apparatus to the content executed by the execution unit, a control data acquisition unit configured to acquire control data for a control target unit of an apparatus from the content executed by the execution unit, and a control data provision unit configured to provide the control data to the second apparatus.

A further aspect of the present invention is a method for transmitting control data from an information processing apparatus which is operated by a first apparatus used by a first user, the method including a step of performing a sharing process of a content image with a second user, and a step of transmitting content image data to a different information processing apparatus which is operated by a second apparatus used by a second user, wherein the step of performing a sharing process includes a step of acquiring operation information of the second apparatus from the different information processing apparatus, a step of providing the acquired operation information of the second apparatus to a content being executed, a step of acquiring control data for a control target unit of an apparatus from the content being executed, and a step of providing the control data to the second apparatus.

It is to be noted that also arbitrary combinations of the constituent elements described above and the representations of the present invention obtained by conversion thereof between a method, an apparatus, a system, a recording medium, a computer program and so forth are effective as modes of the present invention.

BRIEF DESCRIPTION OF DRAWINGS

FIG. 2 (a) is a diagram depicting an appearance configuration of an upper face of an inputting apparatus, and (b) is a diagram depicting an appearance configuration of a rear face of the inputting apparatus.

FIG. 13 is a view depicting an explanation screen image of shared play.

FIG. 20 is a view depicting an example of a game screen image displayed on an outputting apparatus.

FIG. 21 is a view depicting a game screen image displayed to the user C.

FIG. 27 is a view depicting an example of a member screen image of a chat room.

DESCRIPTION OF EMBODIMENT

Figure 1:
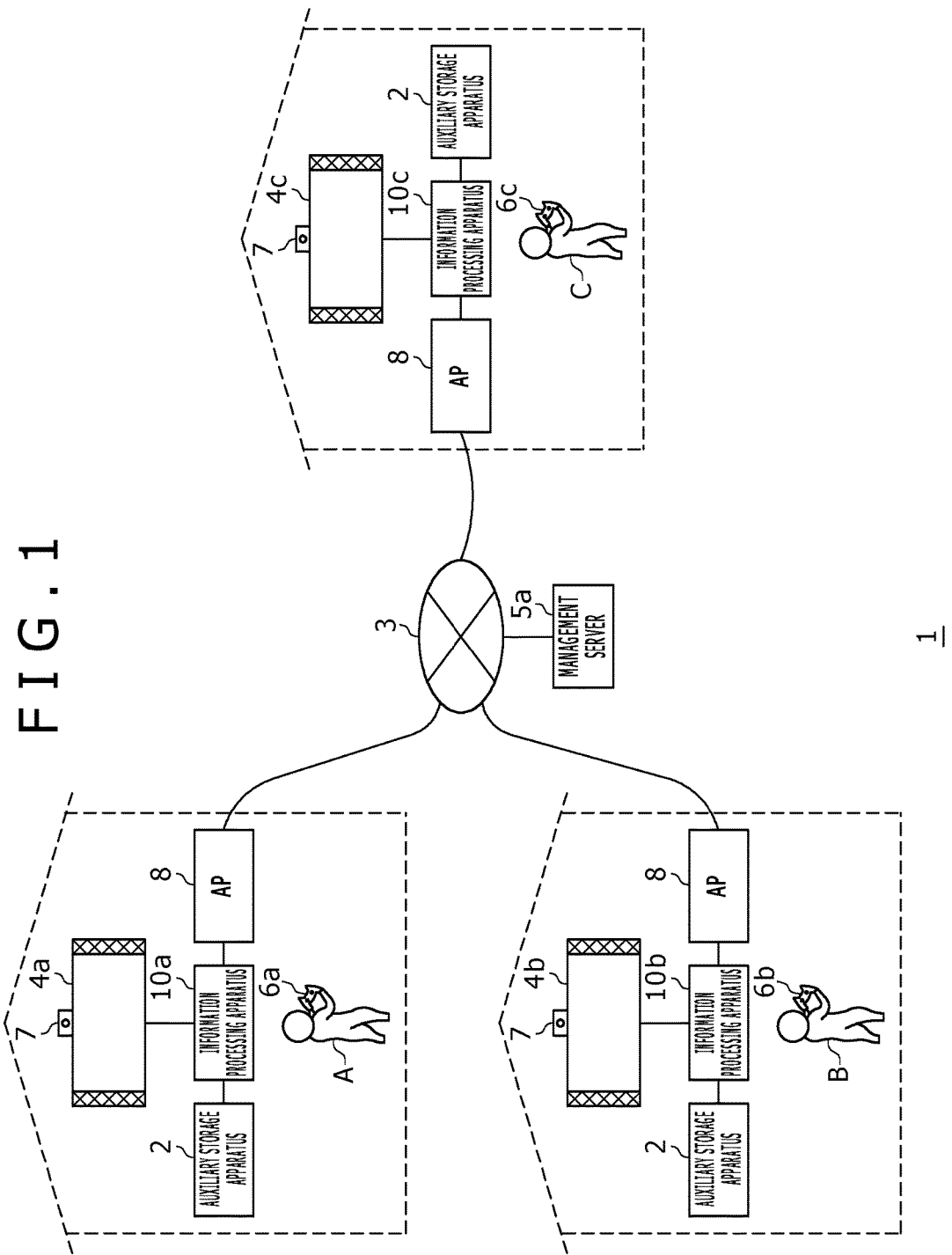
FIG. 1 is a diagram depicting an information processing system according to an embodiment of the present invention.

FIG. 1 depicts an information processing system 1 according to an embodiment of the present invention. The information processing system 1 includes information processing apparatus 10a, 10b and 10c (where they are not specifically distinguished from each other, each of them is hereinafter referred to as "information processing apparatus 10") and a management server 5, which are connected to each other through a network 3 such as the Internet or a LAN (Local Area Network). In FIG. 1, a manner is illustrated in which a user A operates the information processing apparatus 10a using an inputting apparatus 6a; a user B operates the information processing apparatus 10b using another inputting apparatus 6b; and a user C operates the information processing apparatus 10c using a further inputting apparatus 6c. It is to be noted that, where the inputting apparatus 6a, 6b and 6c are not specifically distinguished from each other, each of them is hereinafter referred to as "inputting apparatus 6." In this manner, each information processing apparatus 10 is operated by an inputting apparatus 6 used by a user.

An access point (hereinafter referred to as "AP") 8 has functions of a wireless access point and a router, and each of the information processing apparatus 10 is connected to the AP 8 by a wireless or wire connection such that it is connected for communication with the management servers 5 on the network 3 or another information processing apparatus 10 operated by a different user.

The information processing apparatus 10 establishes connection to an inputting apparatus 6, which is operated by a user, by wireless or wire connection, and the inputting apparatus 6 provides the information processing apparatus 10 with operation information representative of a result of the operation of the user. If the information processing apparatus 10 accepts operation information from the inputting apparatus 6, then it reflects the operation information on processing of system software or application software, and a result of the processing is outputted from an outputting apparatus. In the information processing system 1, the information processing apparatus 10 may be a game apparatus which executes a game, and the inputting apparatus 6 may be an apparatus which supplies operation information of the user to the information processing apparatus 10 such as a game controller. In the information processing system 1, the information processing apparatus 10 of one user streaming distributes game image data of a game being played to the information processing apparatus 10 of the different users. Accordingly, the information processing system 1 in the present embodiment operates as a game image distribution system.

In the information processing system 1, it is necessary for each user to log in to an OS (Operating System; system software) of the information processing apparatus 10 in order for the information processing apparatus 10 to execute an application of a game or the like. The user who logs in to the system software is managed by a user account registered in the information processing apparatus 10. A user who does not have a user account cannot log in to the information processing apparatus 10 and accordingly cannot play a game in principle. However, in the information processing apparatus 10 of the present embodiment, a mechanism for exceptionally issuing a temporary user account to a user who does not have a user account to allow the user to log in as a guest user to the information processing apparatus 10 is provided. Consequently, a user who does not have a user account can temporarily log in as a guest user to the information processing apparatus 10 of the host user and play a game together with the host user.

An auxiliary storage apparatus 2 is a large capacity storage apparatus such as an HDD (Hard Disk Drive) or a flash memory and may be an external storage apparatus connected to the information processing apparatus 10 by a USB (Universal Serial Bus) or may be a built-in type storage apparatus. The outputting apparatus 4 may be a television set having a display unit which outputs an image and a speaker which outputs sound or may be a computer display unit. The outputting apparatus 4 may be connected to the information processing apparatus 10 by a wire cable or by wireless connection.

The inputting apparatus 6 includes a plurality of inputting units such as a plurality of operation buttons of the push type, an analog stick which can input an analog quantity and turning buttons. A camera 7 which is an image pickup apparatus is provided in the proximity of the outputting apparatus 4 and picks up an image of a space around the outputting apparatus 4. While FIG. 1 depicts an example wherein the camera 7 is attached to an upper portion of the outputting apparatus 4, the camera 7 may otherwise be disposed sidewardly of the outputting apparatus 4. Whatever the case may be, the camera 7 is disposed at a position at which the camera 7 can pick up an image of a user who plays a game in front of the outputting apparatus 4. It is to be noted that the camera 7 may be a stereo camera.

In the information processing system 1, it is possible for a plurality of users to utilize an application for chat to enjoy voice chat or text chat or to transmit camera images to each other to enjoy video chat.

In the information processing system 1, the information processing apparatus 10a, 10b and 10c individually activate a chat application, and the users A, B and C are chatting with one another. In a state in which the users A, B and C chat with one another in this manner, one user (host user) can share a game image with one different user (guest user). For example, if a game image of the user A is distributed from the information processing apparatus 10a to the information processing apparatus 10c during game play of the user A, then the user C can view the game image of the user A. In the present embodiment, that content image data processed by the information processing apparatus 10a is transmitted to the different information processing apparatus 10c to establish a state in which the user A and the user C can view a content image together with each other is referred to as "sharing of a content image." It is to be noted that, although the information processing apparatus 10a and the information processing apparatus 10c may be connected to each other by a P2P connection to perform transmission and reception of data, transmission and reception of data may be performed through the management server 5.

The management server 5 provides a network service of a game to users of the information processing system 1. The management server 5 manages network accounts for identifying the users, and each user would use its network account to sign in to the network service provided by the management server 5.

If a login user signs in to the network service from its information processing apparatus 10, then the login user can register save data of a game or a virtual award item (trophy) acquired during game play into the management server 5. In the present embodiment, in order for each information processing apparatus 10 to communicate with a different information processing apparatus 10, it is assumed that a user signs in to the management server 5. Accordingly, if the user does not sign in to the management server 5, then the user is not permitted to perform chat with a different user or to perform sharing of a content image.

FIG. 2(a) depicts an appearance configuration of an upper face of the inputting apparatus. The user would grasp a left side grip portion 78b by the left hand and grasp a right side grip portion 78a by the right hand to operate the inputting apparatus 6. On an upper face of a housing of the inputting apparatus 6, a direction key 71, analog sticks 77a and 77b and four different operation buttons 76 which are inputting units are provided. Four buttons 72 to 75 have different figures marked with different colors thereon in order to allow distinction thereof from one another. In particular, the circle button 72 is marked with a red round mark; the cross button 73 with a blue cross mark; the square button 74 with a purple square mark; and the triangular button 75 with a green triangle mark. On the upper face of the housing, a touch pad 79 is provided in a flat region between the direction key 71 and the operation buttons 76. The touch pad 79 functions also as a depression type button which sinks downwardly when it is pushed by the user and returns to its original position when it is released by the user.

A function button 80 is provided between the two analog sticks 77a and 77b. The function button 80 is used to turn on the power supply to the inputting apparatus 6 and simultaneously make active a communication function of connecting the inputting apparatus 6 and the information processing apparatus 10 to each other. After the inputting apparatus 6 is connected to the information processing apparatus 10, the function button 80 is used also to cause the information processing apparatus 10 to display a home screen image.

A SHARE button 81 is provided between the touch pad 79 and the direction key 71. The SHARE button 81 is utilized to input an instruction from the user to an OS or the system software in the information processing apparatus 10. An OPTIONS button 82 is provided between the touch pad 79 and the operation buttons 76. The OPTIONS button 82 is utilized to input an instruction from the user to application (game) software executed by the information processing apparatus 10. The SHARE button 81 and the OPTIONS button 82 may each be formed as a push-type button.

FIG. 2(b) depicts an appearance configuration of a rear face of the inputting apparatus. On the upper side of the rear face of the housing of the inputting apparatus 6, the touch pad 79 is provided so as to extend from the upper face of the housing, and a horizontally elongated light emitting unit 85 is provided on the lower side of the rear face of the housing. The light emitting unit 85 has LEDs (Light Emitting Diodes) of red (R), green (G) and blue (B) and is turned on in accordance with emission light color information transmitted thereto from the information processing apparatus 10. On the rear face of the housing, an upper side button 83a and a lower side button 84a, and another upper side button 83b and another lower side button 84b are provided at positions in a leftwardly and rightwardly symmetrical relationship in a longitudinal direction. The upper side button 83a and the lower side button 84a are operated by the forefinger and the middle finger of the right hand of the user, respectively, and the upper side button 83b and the lower side button 84b are operated by the forefinger and the middle finger of the left hand of the user, respectively. The upper side buttons 83 may be configured as push-type buttons while the lower side buttons 84 may be configured as trigger type buttons supported for pivotal motion.

Figure 3:
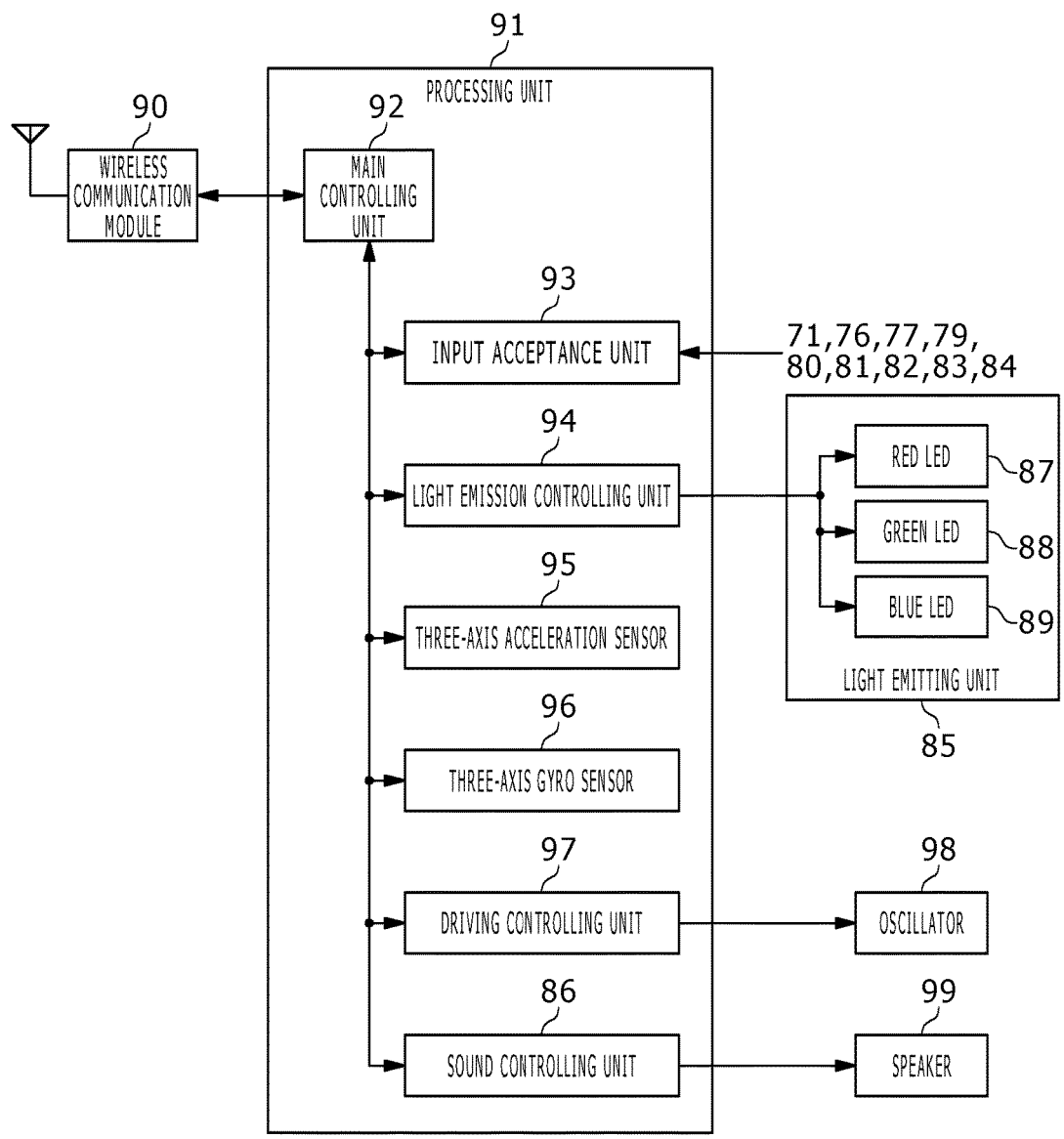
FIG. 3 is a view depicting functional blocks of the inputting apparatus.

FIG. 3 depicts functional blocks of the inputting apparatus 6. The inputting apparatus 6 includes a wireless communication module 90, a processing unit 91, a light emitting unit 85, an oscillator 98 and a speaker 99. The wireless communication module 90 has a function for transmitting and receiving data to and from a wireless communication module of the information processing apparatus 10. The processing unit 91 executes desired processing of the inputting apparatus 6.

The processing unit 91 includes a main controlling unit 92, an input acceptance unit 93, a light emission controlling unit 94, a three-axis acceleration sensor 95, a three-axis gyro sensor 96, a driving controlling unit 97 and a sound controlling unit 86. The main controlling unit 92 performs transmission and reception of necessary data to and from the wireless communication module 90.

The input acceptance unit 93 accepts input information from inputting units such as the direction key 71, operation button 76, operation button 77, touch pad 79, function button 80, SHARE button 81, OPTIONS button 82, upper side button 83 and lower side button 84 and sends the accepted information to the main controlling unit 92. The main controlling unit 92 converts the received input information into a predetermined control signal as occasion demands and supplies the control signal to the wireless communication module 90. The wireless communication module 90 transmits the control signal to the information processing apparatus 10 at a predetermined timing. The light emission controlling unit 94 controls emission of light from the red LED 87, green LED 88 and blue LED 89 which configure the light emitting unit 85. The three-axis acceleration sensor 95 detects acceleration components in three-axis directions of XYZ of the inputting apparatus 6, and the three-axis gyro sensor 96 detects angular speeds in the XZ plane, ZY plane and YX plane.

In the information processing system 1 of the present embodiment, if a user depresses the function button 80 in a state in which the power supply to the inputting apparatus 6 is off, then the power supply to the inputting apparatus 6 is turned on and the main controlling unit 92 generates a connection request to the information processing apparatus 10. Then, the wireless communication module 90 transmits the connection request to the information processing apparatus 10. At this time, even if the information processing apparatus 10 is in a main power supply off state, since the wireless communication module in the information processing apparatus 10 is in an active state, the information processing apparatus 10 receives the connection request and turns on the main power supply to activate the OS (system software) to establish a wireless connection to the inputting apparatus 6.

The system software of the information processing apparatus 10 determines a light emission color of the light emitting unit 85 of the inputting apparatus 6 from which the connection request has been transmitted, and transmits the light emission color information to the inputting apparatus 6. At this time, preferably the system software analyzes color information included in the space of the image picked up by the camera 7 to specify colors which are not included in the environment color as far as possible to determine a light emission color of the light emitting unit 85. As a result, after the light emitting unit 85 is turned on, the light emitting unit 85 which is to emit light in the designated light emission color can be detected suitably from the picked up image of the camera 7.

The light emission color information received by the wireless communication module 90 is passed to the main controlling unit 92, and the main controlling unit 92 notifies the light emission controlling unit 94 of the light emission color information. Consequently, the light emission controlling unit 94 can control the light emitting unit 85 to emit light in the designated light emission color.

The driving controlling unit 97 drives the oscillator 98 including an eccentric motor and so forth. The sound controlling unit 86 outputs sound from the speaker 99. In the inputting apparatus 6, the light emission controlling unit 94, driving controlling unit 97 and sound controlling unit 86 control the light emitting unit 85, oscillator 98 and speaker 99, respectively, in accordance with control data provided from the game program executed by the information processing apparatus 10. Accordingly, the light emitting unit 85, oscillator 98 and speaker 99 can each be called control target unit controlled by the game program. The light emitting unit 85, oscillator 98 and speaker 99 are controlled in operation thereof with the control data supplied from the game program and can thereby provide feedback from the game to the user who operates the inputting apparatus 6. This feedback makes a significant factor to raise the presence in the game and provide game fun to the user.

Figure 4:
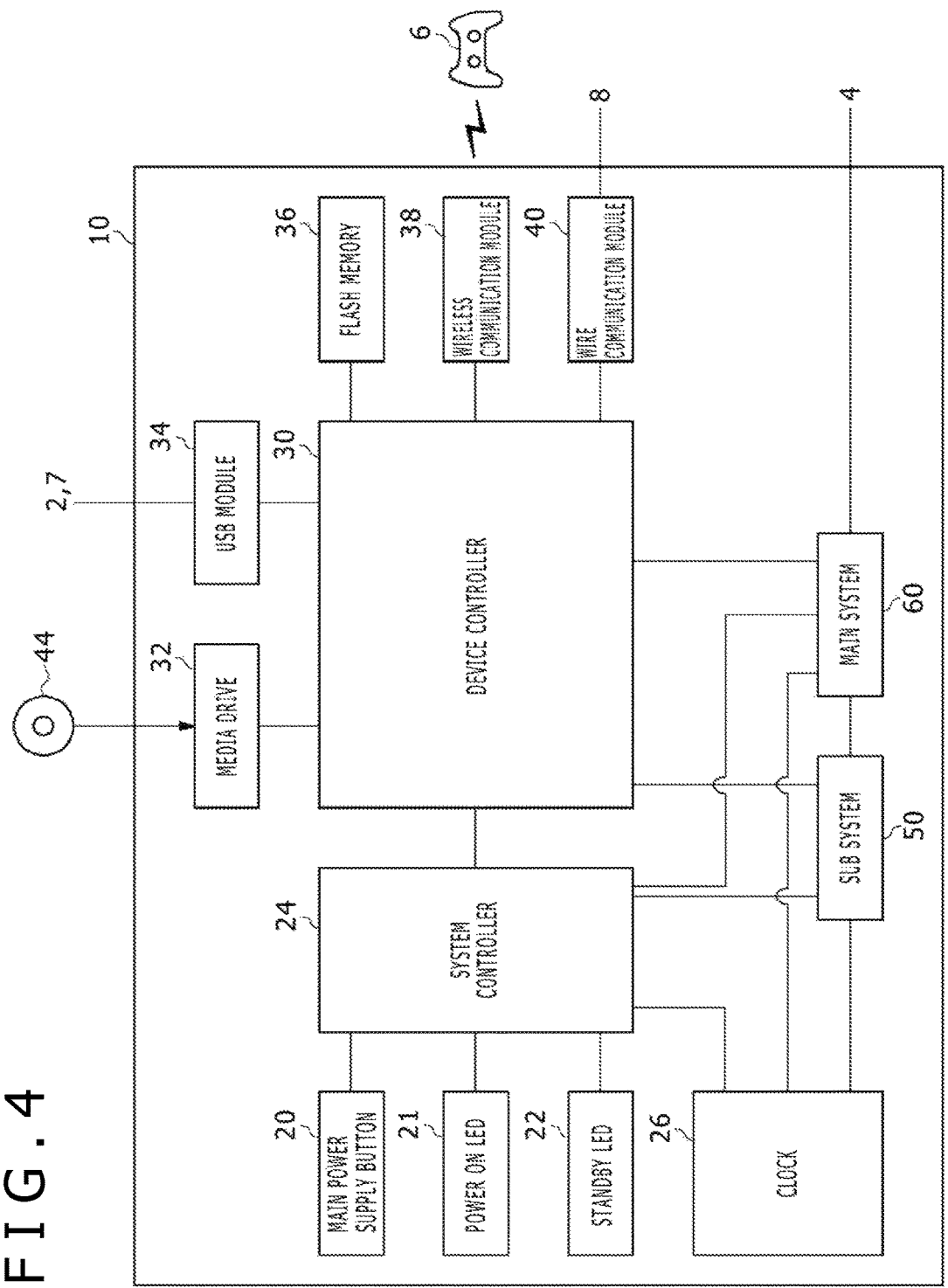
FIG. 4 is a diagram depicting functional blocks of an information processing apparatus.

FIG. 4 depicts functional blocks of the information processing apparatus 10. The information processing apparatus 10 includes a main power supply button 20, a power ON LED 21, a standby LED 22, a system controller 24, a clock 26, a device controller 30, a media drive 32, a USB module 34, a flash memory 36, a wireless communication module 38, a wire communication module 40, a sub system 50 and a main system 60.

The main system 60 includes a main CPU (Central Processing Unit), a memory which is a main storage apparatus and a memory controller, a GPU (Graphics Processing Unit) and so forth. The GPU is utilized principally for arithmetic processing of a game program. Those functions may be configured as a system-on-chip and formed on one chip. The main CPU has a function for executing a game program recorded in the auxiliary storage apparatus 2.

The sub system 50 includes a sub CPU, a memory which is a main storage apparatus, a memory controller and so forth, but does not include a GPU and does not have a function for executing a game program. The number of circuit gates of the sub CPU is smaller than the circuit gate number of the main CPU, and the operation power consumption of the sub CPU is lower than the operation power consumption of the main CPU. The sub CPU operates also while the main CPU is in a standby state and is limited in processing function thereof so as to suppress the power consumption low.

The main power supply button 20 is an inputting unit through which an operation input is performed by a user and is provided on the front face of the housing of the information processing apparatus 10. The main power supply button 20 is operated in order to turn on or off power supply to the main system 60 of the information processing apparatus 10. The power ON LED 21 is turned on when the main power supply button 20 is switched on, and the standby LED 22 is turned on when the main power supply button 20 is switched off.

The system controller 24 detects depression of the main power supply button 20 by a user. If the main power supply button 20 is depressed when the main power supply is in an off state, then the system controller 24 acquires the depression operation as a "turn on instruction," but if the main power supply button 20 is depressed when the main power supply is in an on state, then the system controller 24 acquires the depression operation as a "turn off instruction."

The clock 26 is a real time clock, and generates date and time information at present and supplies the generated information to the system controller 24, sub system 50 and main system 60. The device controller 30 is configured as an LSI (Large-Scale Integrated Circuit) which executes delivery of information between devices like a south bridge. As depicted in the figure, such devices as the system controller 24, media drive 32, USB module 34, flash memory 36, wireless communication module 38, wire communication module 40, sub system 50 and main system 60 are connected to the device controller 30. The device controller 30 absorbs a difference in electric characteristic or a difference in data transfer rate between the devices and controls the timing of data transfer.

The media drive 32 is a drive apparatus which operates a ROM (Read Only Memory) medium 44, on which application software of a game or the like and license information are recorded, loaded thereon to read out a program, data and so forth from the ROM medium 44. The ROM medium 44 is a read-only recording medium such as an optical disk, a magneto-optical disk or a Blu-ray disk.

The USB module 34 is a module to be connected to an external apparatus by a USB cable. The USB module 34 may be connected to the auxiliary storage apparatus 2 and the camera 7 by a USB cable. The flash memory 36 is an auxiliary storage apparatus which configures an internal storage. The wireless communication module 38 wirelessly communicates, for example, with the inputting apparatus 6 using a communication protocol such as a Bluetooth (registered trademark) protocol or an IEEE (Institute of Electrical and Electronics Engineers) 802.11 protocol. It is to be noted that the wireless communication module 38 may be compatible with a third generation (3rd Generation) digital portable telephone system compliant with the IMT-2000 (International Mobile Telecommunication 2000) standard prescribed by the ITU (International Telecommunication Union) or may be compatible with a different generation digital portable telephone system. The wire communication module 40 wire-communicates with an external apparatus and is connected to an external network, for example, through the AP 8.

In the information processing system 1 of the present embodiment, a plurality of information processing apparatus 10 of different users execute a chat application and are connected to each other by P2P connection. In this state, the users can communicate with each other by voice chat, text chat or the like. It is to be noted that each user can enjoy chat with a different user simultaneously while the user enjoys a game by itself, and can also share a game image with a different user who is in chat connection with the user.

Further, in the present embodiment, a plurality of modes are prepared for sharing of a game image. In the following description, to share a game image is sometimes referred to as "share play" for the convenience of description. It is to be noted that, in share play, a user of a distribution source of a game image is referred to as "host" or "host user" and a user of a distribution destination is referred to as "guest" or "guest user." In the description given below, three modes of share play are described. In the share play, a guest user receives a game image provided from the host user and may not have the game software. It is to be noted that the share play in the present embodiment assumes that the host user and the guest user are in chat connection and can communicate with each other through chat while they perform share play.

<Share Play 1>

The first share play may be called "share screen," in which a game image of the host user is shared with the guest user. The share screen is a basic mode of share play, and upon starting of share play, the share screen is first set as a sharing mode. In the share screen, although the guest user can view a game image of the host user, the guest user cannot perform game operation.

Accordingly, the share play 1 is a sharing mode in which, while the host user and the guest user share a game image of the host user, the guest user does not have the control right of the game.

The following share plays 2 and 3 are sharing modes in which the control right of a game is passed to the guest user while the share screen function of the share play 1 is presupposed.

<Share Play 2>

The second share play may be called "assist play," in which, while a game image of the host user is shared with the guest user, the guest user performs a game operation in place of the host user. In the assist play, the host user passes the control right of an own game to the guest user, and accordingly, the host user cannot operate the game while only the guest user can perform a game operation.

Accordingly, the share play 2 is considered a sharing mode in which, while the host user and the guest user share a game image of the host user, the control right of the game is passed to the guest user in place of the host user.

<Share Play 3>

The third share play may be called "joint play," in which, while a game image of the host user is shared with the guest user, the guest user participates as a new player in the game and plays the game together with the host user. In other words, in the joint play, the host user and the guest user can participate as player 1 and player 2, respectively, in a game making use of game resources of the host user side such that the host user and the guest user can operate the game together with each other.

Accordingly, the share play 3 is considered a sharing mode in which, while the host user and the guest user share a game image of the host user, both of the host user and the guest user simultaneously have the control right of the game.

In the following, a configuration of the information processing apparatus 10 of the host user and a configuration of the information processing apparatus 10 of the guest user are described, and a mechanism in which share play is performed between the host user and the guest user is described. It is to be noted that, in the example described below, a case is described in which the user A acts as the host user and the user C acts as the guest user. Naturally, however, in the information processing system 1, also it is possible for the user C to act as the host user and also it is possible for the user A to act as the guest user. Also it is possible for some other user, for example, the user B or a different user not depicted to act as any of the host user and the guest user similarly. Accordingly, it is additionally remarked that, in the following description, the configuration described as that of the information processing apparatus 10a or the information processing apparatus 10c is provided in all of the information processing apparatus 10.

Figure 5:
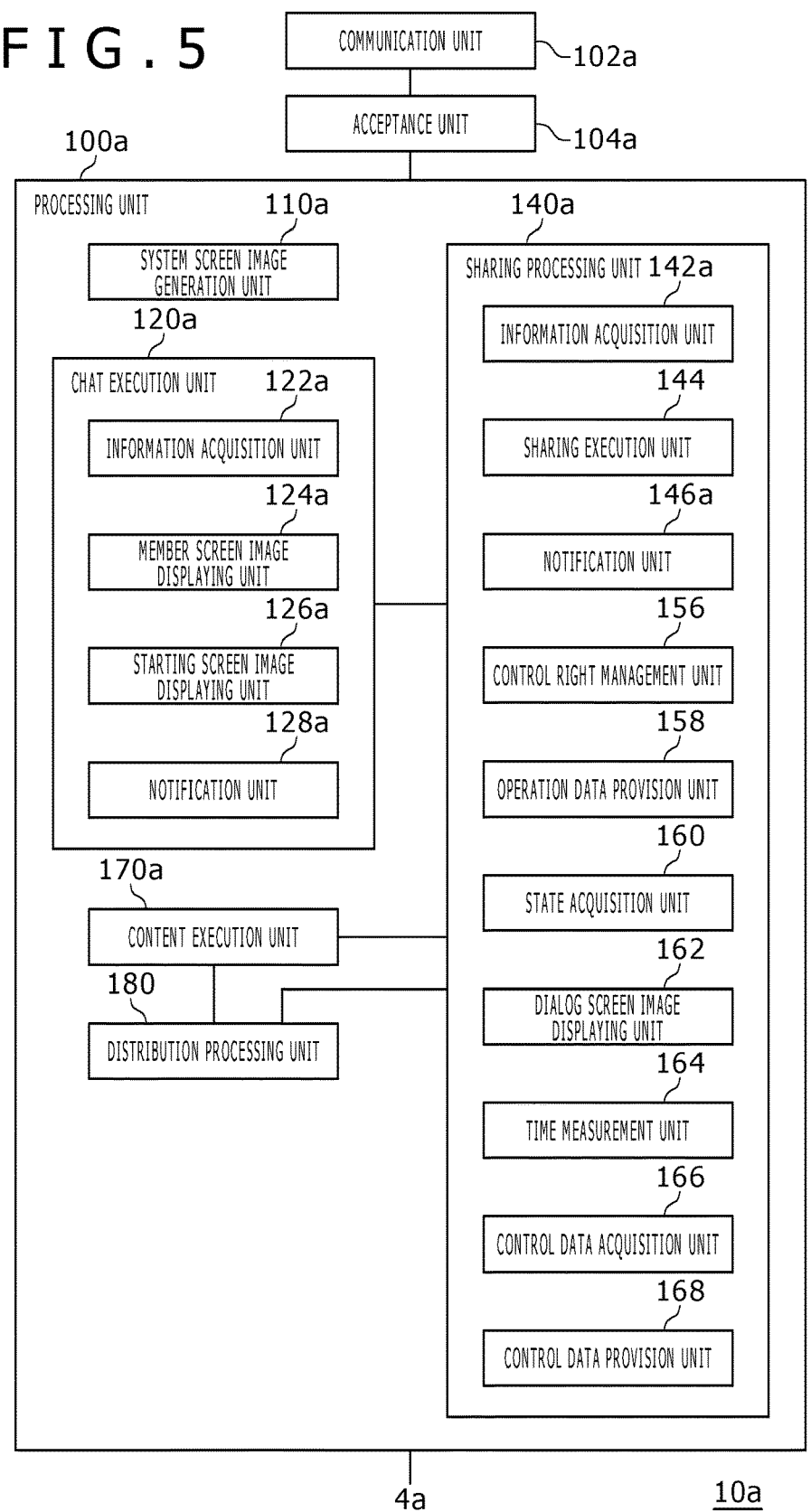
FIG. 5 is a view depicting a configuration of an information processing apparatus of a host user.

FIG. 5 depicts a configuration of the information processing apparatus 10a of the host user. The information processing apparatus 10a includes a processing unit 100a, a communication unit 102a and an acceptance unit 104a. The processing unit 100a includes a system screen image generation unit 110a, a chat execution unit 120a, a sharing processing unit 140a, a content execution unit 170a and a distribution processing unit 180. The chat execution unit 120a is implemented by a chat application and has a function for connecting to the chat application of a different user by P2P connection to transmit and receive data of voice or text. The chat execution unit 120a includes an information acquisition unit 122a, a member screen image displaying unit 124a, a starting screen image displaying unit 126a and a notification unit 128a. The sharing processing unit 140a is implemented by a share application and performs a sharing process of a content image with a different user. The sharing processing unit 140a includes an information acquisition unit 142a, a sharing execution unit 144, a notification unit 146a, a control right management unit 156, an operation data provision unit 158, a state acquisition unit 160, a dialog screen image displaying unit 162, a time measurement unit 164, a control data acquisition unit 166 and a control data provision unit 168.

The acceptance unit 104a is provided between the communication unit 102a and the processing unit 100a and transmits data or information between the communication unit 102a and the processing unit 100a. It is to be noted that the communication unit 102a represents functions of the wireless communication module 38 and the wire communication module 40 depicted in FIG. 4. In the present embodiment, since the user A who acts as the host user distributes a play moving picture of a game by streaming distribution, it is described that the information processing apparatus 10a depicted in FIG. 1 has the configuration depicted in FIG. 5. However, as described hereinabove, also the other users B and C in the information processing system 1 can act each as a host user in share play, and accordingly, also the information processing apparatus 10b and 10c have the configuration depicted in FIG. 5.

Figure 6:
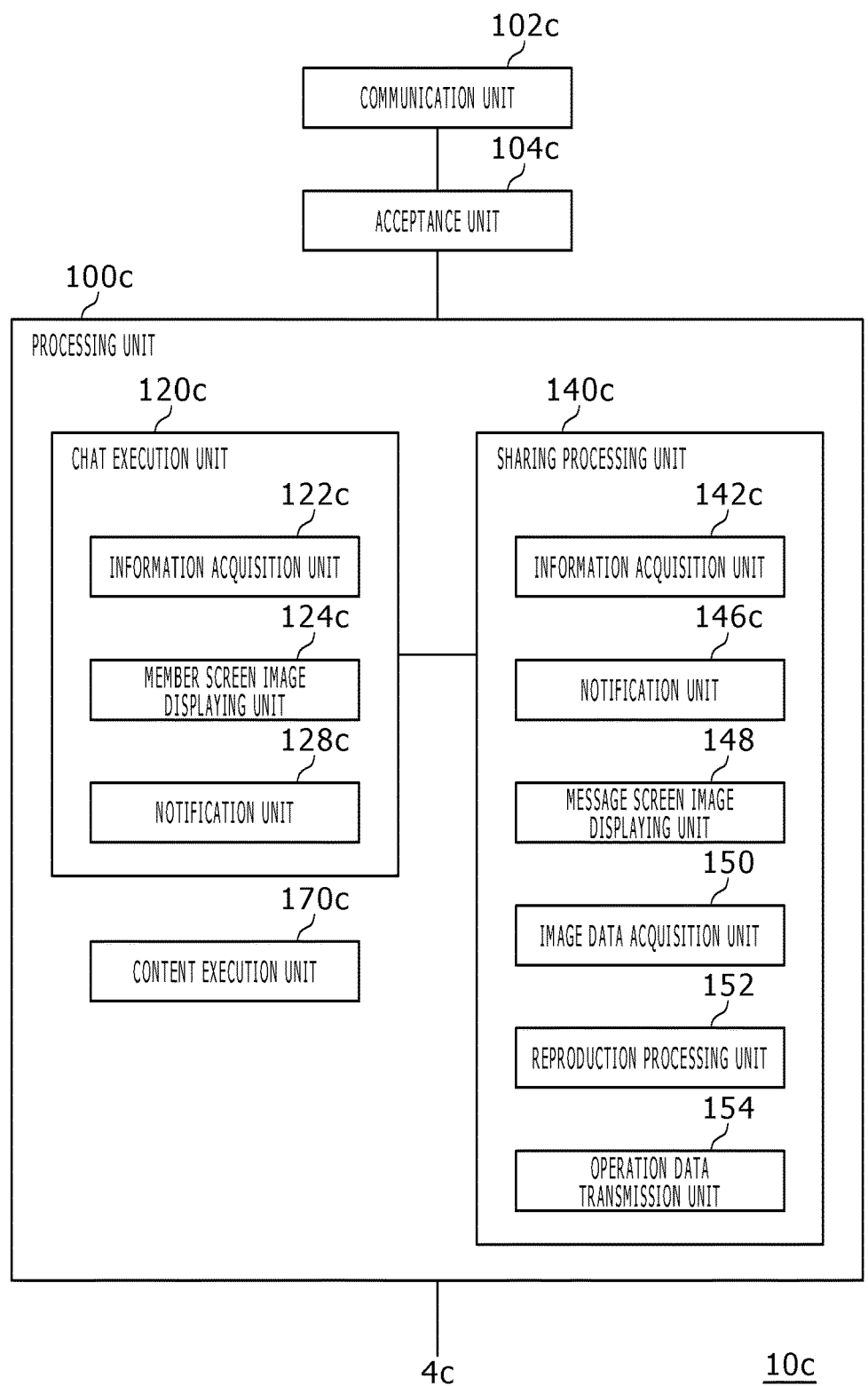
FIG. 6 is a view depicting a configuration of an information processing apparatus of a guest user.

FIG. 6 depicts a configuration of the information processing apparatus 10c of the guest user. The information processing apparatus 10c includes a processing unit 100c, a communication unit 102c and an acceptance unit 104c. The processing unit 100c includes a chat execution unit 120c, a sharing processing unit 140c and a content execution unit 170c. The chat execution unit 120c is implemented by the chat application and has a function for connecting to the chat application of a different user by P2P connection to transmit and receive data of voice or text. The chat execution unit 120c includes an information acquisition unit 122c, a member screen image displaying unit 124c and a notification unit 128c. The sharing processing unit 140c is implemented by the share application and performs a sharing process of a content image with a different user. The sharing processing unit 140c includes an information acquisition unit 142c, a notification unit 146c, a message screen image displaying unit 148, an image data acquisition unit 150, a reproduction processing unit 152 and an operation data transmission unit 154.

The acceptance unit 104c is provided between the communication unit 102c and the processing unit 100c and transmits data or information between the communication unit 102c and the processing unit 100c. It is to be noted that the communication unit 102c represents the functions of the wireless communication module 38 and the wire communication module 40 depicted in FIG. 4. In the present embodiment, since the user C performs share play with the user A, it is described that the information processing apparatus 10c in FIG. 1 has the configuration depicted in FIG. 6. However, in the information processing system 1, also the other users A and C can act each as a guest user in the share play as described hereinabove, and accordingly, also the information processing apparatus 10a and 10b have the configuration depicted in FIG. 6.

The components described as functional blocks which perform various processes in FIGS. 5 and 6 are configured, in hardware, from circuit blocks, memories and other LSIs and are implemented, in software, by a program loaded in a memory and so forth. Accordingly, it is recognized by those skilled in the art that the functional blocks can be implemented in various forms from only hardware, only software or a combination of them and are not restricted to any of them. In the following, the functions for implementing share play are described.

First, in the present embodiment, in order for the host user and the guest user to carry out share play, it is necessary for both of them to participate in the same chat room. It is to be noted that an establishing person of a chat room may be any user, and any user other than the host user and the guest user may establish a chat room. In the following, a mechanism in which the user A participates in a chat room is described on the basis of the configuration depicted in FIG. 5. It is to be noted that also a different user can participate in a chat room by a similar procedure.

If the user A logs in to the information processing apparatus 10a, then the system screen image generation unit 110a generates a home screen image for the user A and displays the home screen image on the outputting apparatus 4a.

Figure 7:
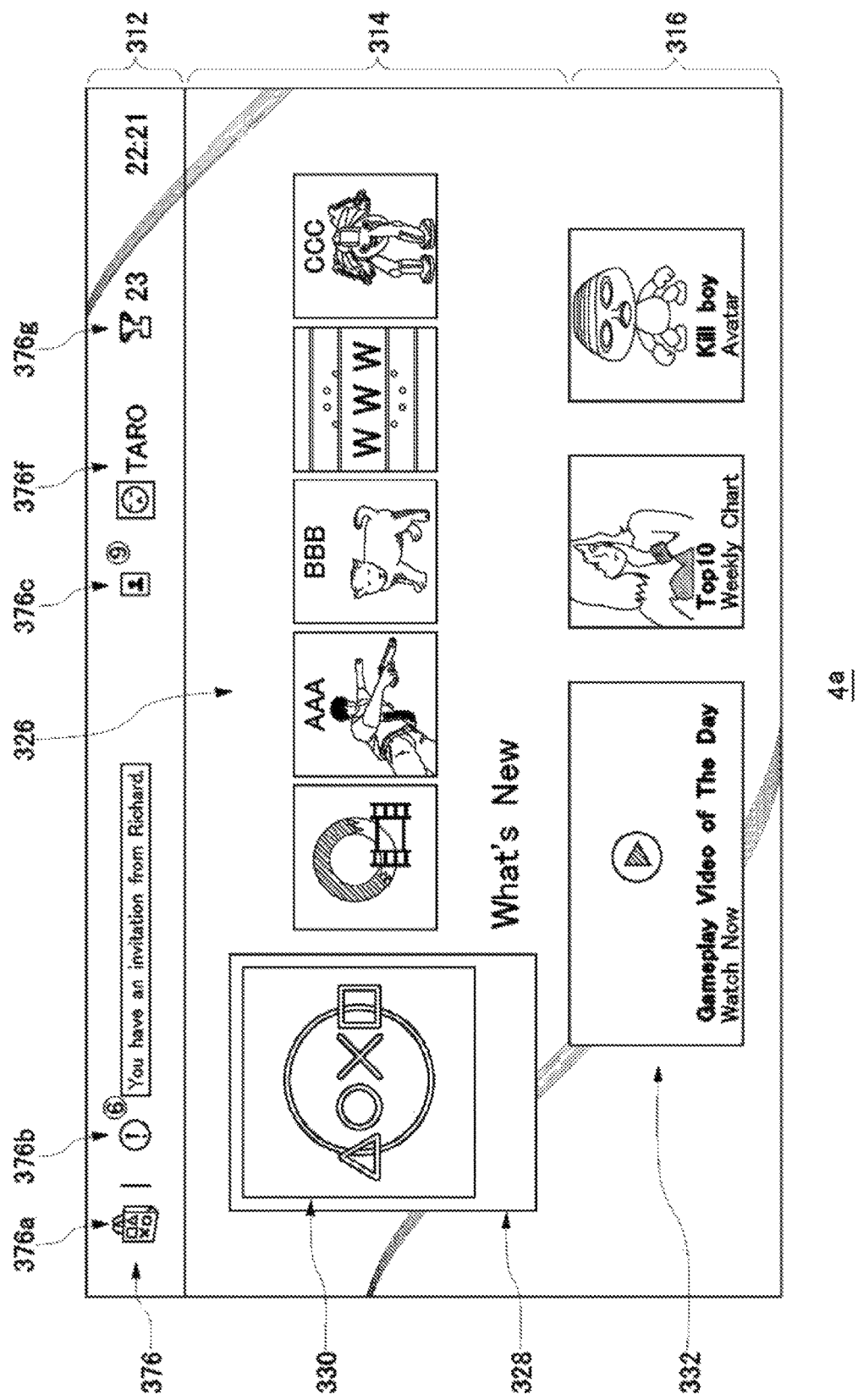
FIG. 7 is a view depicting an example of a home screen image.

FIG. 7 depicts an example of the home screen image. The system screen image generation unit 110a places a new arrival information icon 330 at the top (namely, at the left end) of an icon row. When the system screen image generation unit 110a displays the home screen image first, it places, in a content area 314, the new arrival information icon 330 into a focus frame 328 to put the new arrival information icon 330 into a focused state. The system screen image generation unit 110a places content icons 326 in a juxtaposed relationship in the icon row and places a live information item 332 into a live area 316.

Further, the system screen image generation unit 110a places part of a plurality of function icons 376, which indicate a plurality of system functions provided by the information processing apparatus 10, into a system area 312. In the example of FIG. 7, a store icon 376a, a notification icon 376b, a friend icon 376c, a profile icon 376f and a trophy icon 376g are displayed. It is to be noted that the profile icon 376f is a GUI (Graphical User Interface) for causing a profile of the user A (TARO) to be displayed.

The system screen image generation unit 110a places an on-line number indicator, which indicates an on-line friend user number, namely, the number of friends (in FIG. 7, "9") who are logged in other information processing apparatus 10 at present, in an associated relationship with the friend icon 376c. In the information processing system 1, a friend user is a user who is registered as a friend of the user A in the management server 5. Further, the system screen image generation unit 110a places an unread number indicator, which indicates the number of pieces of information unread by the user (in FIG. 7, "6"), in an associated relationship with the notification icon 376b.

If the user A places, in the home screen image, a content icon 326 of a game to be played on the focus frame 328 and operates a determination button, then the content execution unit 170a executes a game program. The content execution unit 170a performs an arithmetic operation process for moving a game character in a virtual space on the basis of operation information inputted to the inputting apparatus 6a by the user A. The content execution unit 170a includes a GPU (Graphics Processing Unit) which executes a rendering process and so forth, and receives a result of processing of the game program and generates image data of the game to be displayed on the outputting apparatus 4a. In the present embodiment, the content execution unit 170a executes a program of the game title "WARSHIP2" and the user A would play "WARSHIP2" by itself. Thereafter, the user A would return to the home screen image and activate the chat application.

If the user A returns from the game screen image of "WARSHIP2" to the home screen image and then operates the upward key of the inputting apparatus 6a, then the system screen image generation unit 110a generates and displays a function screen image on the outputting apparatus 4a.

Figure 8:
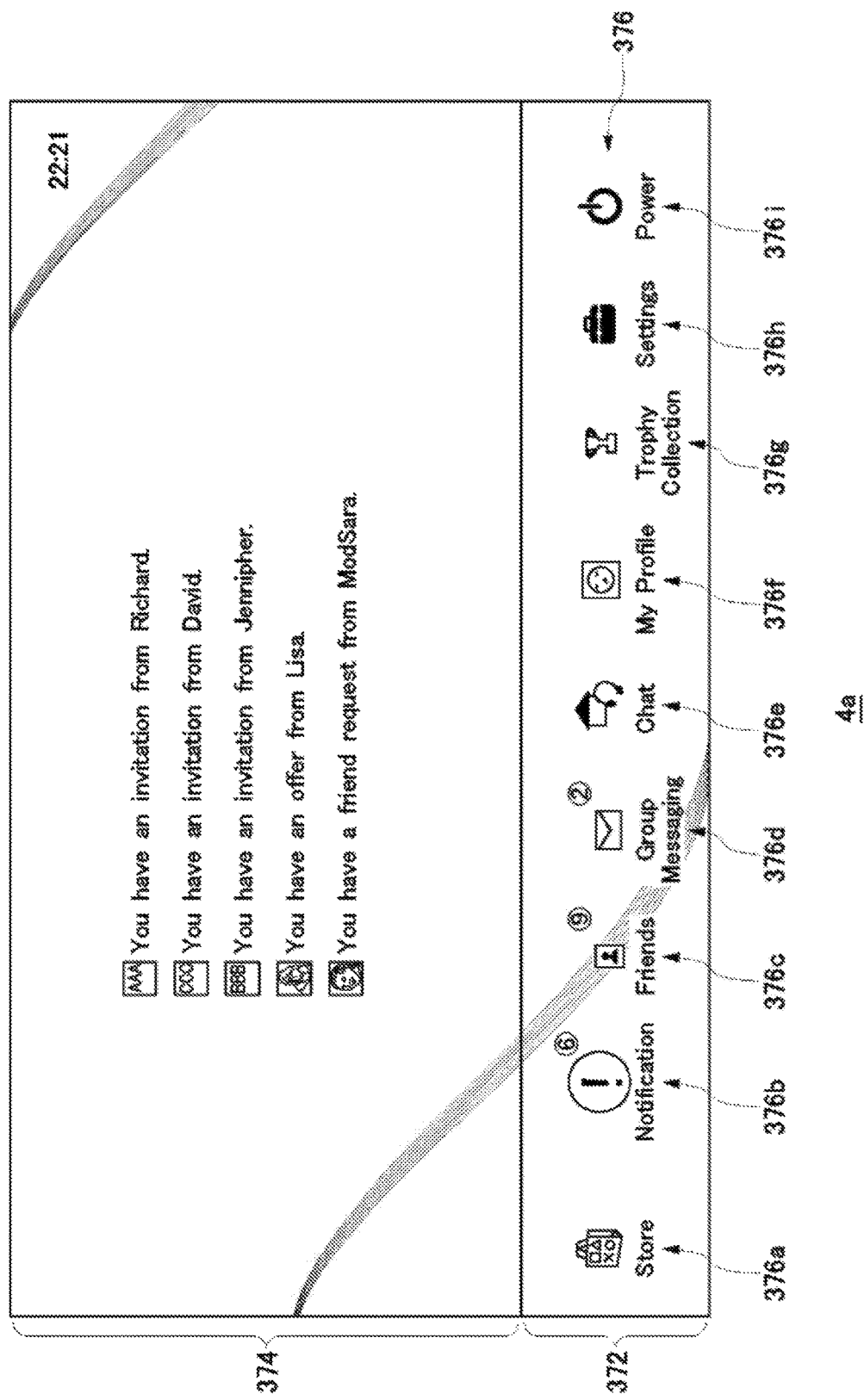
FIG. 8 is a view depicting an example of a function screen image changed from the home screen image.

FIG. 8 depicts an example of a function screen image changed over from the home screen image. The system screen image generation unit 110a places a plurality of function icons 376 in a juxtaposed relationship with each other into a system function selection area 372. Here, a store icon 376a, a notification icon 376b, a friend icon 376c, a group message icon 376d, a chat icon 376e, a profile icon 376f, a trophy icon 376g, a setting icon 376h and a power supply icon 376i are displayed. The system screen image generation unit 110a successively changes over the function icon 376 to be focused in response to an operation input of a horizontal direction of the inputting apparatus 6a by the user A and displays the focused icon in an emphasized mode (in a larger size, in a different color or the like). In FIG. 8, the notification icon 376b is selected and focused and is in a state in which it is emphasized from the other icons, and information to be displayed when the notification icon 376b is selected is depicted in a preview area 374. The user A would select the chat icon 376e from within the system function selection area 372 in order to establish a chat room or to participate in a chat room.

Figure 9:
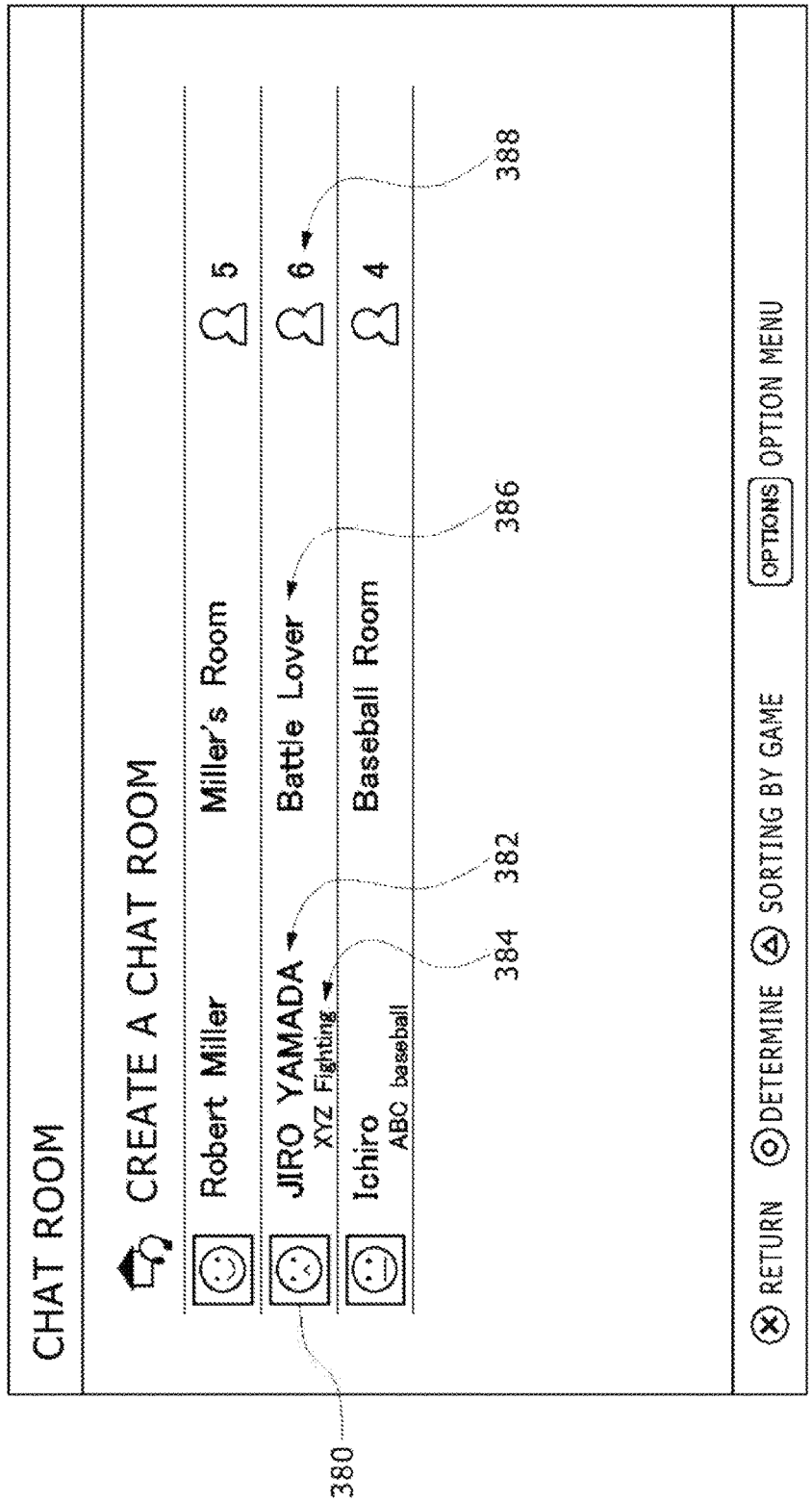
FIG. 9 is a view depicting an example of an entry screen image into a chat room.

FIG. 9 depicts an example of a room entry screen image into a chat room. If the user A selects the chat icon 376e, then the system screen image generation unit 110a generates a room entry screen image. In the room entry screen image, a choice by which the user itself generates a chat room and another choice by which the user participates in a chat room existing already are displayed. In the room entry screen image, the choice "CREATE A CHAT ROOM" is displayed at the top stage, and information of three existing chat rooms is displayed below the top stage. It is to be noted that, if no existing chat room is available, then no choice for a chat room is displayed.

The second existing chat room from above is described. An owner icon 380 is an icon of an owner by whom the chat room is established, and an owner name 382 is a user name of the owner. A game title 384 is a game title name being played at present by the owner, and if the owner is playing no game, then the field is displayed blank. A room name 386 is a name of the chat room established by the owner, and it is indicated here that the chat room name is "Battle Lover" named by "JIRO YAMADA." A participant number indicator 388 indicates the number of people who participates in the chat room.

The user A can select, on the room entry screen image, whether the user A itself is to create a chat room or participate in one of the chat rooms. Here, the user A would select and enter "Battle Lover" established by "JIRO YAMADA." When the user A participates in the chat room, the communication unit 102a acquires address information of members of the chat room the user A has entered and establishes connection to the information processing apparatus 10 of all of the members by P2P connection.

The functions of the chat execution unit 120a are implemented by the chat application. The information acquisition unit 122a acquires user information of the room members, in particular, the user name and the user icon of each member, a game title and a game icon of the game being played and information of a chat situation and so forth, from the information processing apparatus 10 of each room member. The member screen image displaying unit 124a generates a member screen image of the chat room on the basis of the user information acquired by the information acquisition unit 122a and displays the member screen image on the outputting apparatus 4a.

Figure 10:
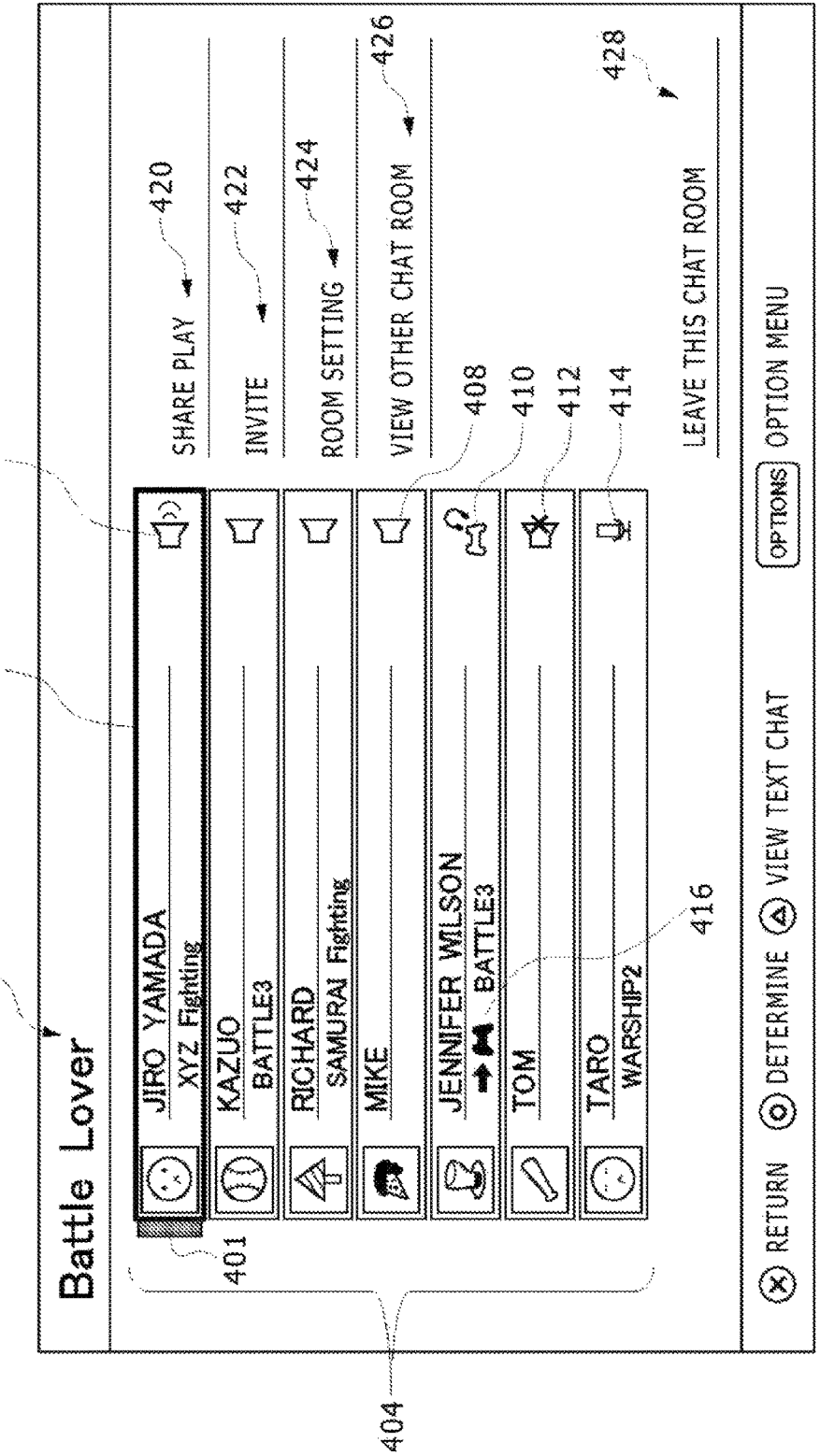
FIG. 10 is a view depicting an example of a member screen image of a chat room.

FIG. 10 depicts an example of a member screen image of a chat room. At the top stage of the member screen image, a room name 400 is displayed. The member screen image displaying unit 124a displays, in a member information area 404 set on the left side in the member screen image, user information relating to the user itself and user information relating to the other members acquired by the information acquisition unit 122a. In the chat room "Battle Lover," seven users participate, and the user information of the members is displayed in a juxtaposed relationship in the form of a list. In the member information area 404, at the top stage, user information of the room owner by whom the room is established is displayed, and an owner indicator 401 indicative of the owner is added. Meanwhile, at the lowermost stage, the user information of the user A itself (namely, TARO) is displayed. Here, it is indicated that the user A is playing the game title "WARSHIP2."

Here, on the right side of each of the display fields of the user information, a situation of chat of the user is indicated by an icon. For example, a chat icon 406 indicates that the user is talking by voice chat; a chat icon 408 indicates that the user is in voice chat connection; a chat icon 410 indicates that a game image is being distributed and the voice output is active; and a chat icon 412 indicates that a microphone output of voice chat is off. Although a chat icon 414 indicates that the user is in voice chat connection, if it is compared with the chat icon 408, then it is different in that the own chat situation is represented not by a speaker but by a microphone. It is to be noted that, while "JENNIFER WILSON" is playing the game title "BATTLE3," it is indicated that the user is executing a session which allows participation and a different user can participate in the session. It is to be noted that the participation in this session is possible when the different user has "BATTLE3," and accordingly, it is to be noted that share play in which a game image is shared even if game software is not possessed is a different type of game participation.

On the right side of the member information area 404, items of functions in this chat room are displayed. A share play item 420 is an item for carrying out share play with a different user, which will be described later. An invitation item 422 is an item for inviting a different user into the chat room. A room setting item 424 is an item for adjusting, for example, a microphone level, sound mix and so forth in the chat. Further, a different room reference item 426 is an item for referring to a different chat room, and a leaving item 428 is an item for leaving the chat room.

In the member screen image, a focus frame 402 is displayed for movement, and the user A can operate the direction key 71 of the inputting apparatus 6a to select a desired item. In the example of FIG. 10, the focus frame 402 is placed in the user display region of "JIRO YAMADA" of the room owner, and if the user A operates the determination button in this state, then a profile screen image of "JIRO YAMADA" may be displayed.

In the present embodiment, the user A makes preparations for performing share play with a different user by participating in the chat room.

Figure 11:
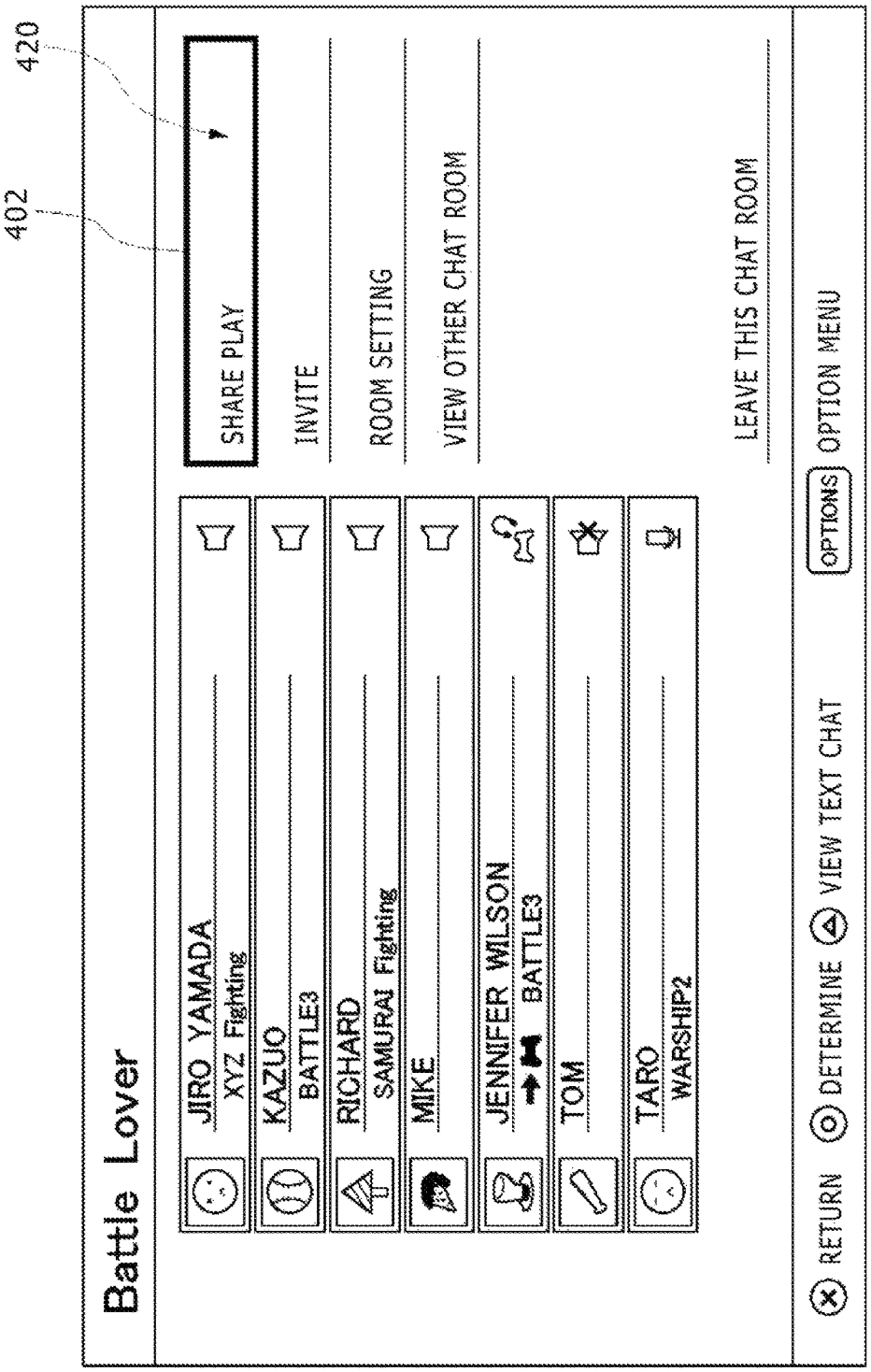
FIG. 11 is a view illustrating a state in which a focus frame is placed on a shared play item.

FIG. 11 depicts a state in which the focus frame 402 is placed on the share play item 420. If the user A operates the determination button of the inputting apparatus 6a, then the user A comes to behave as the host user of share play.

Figure 12:
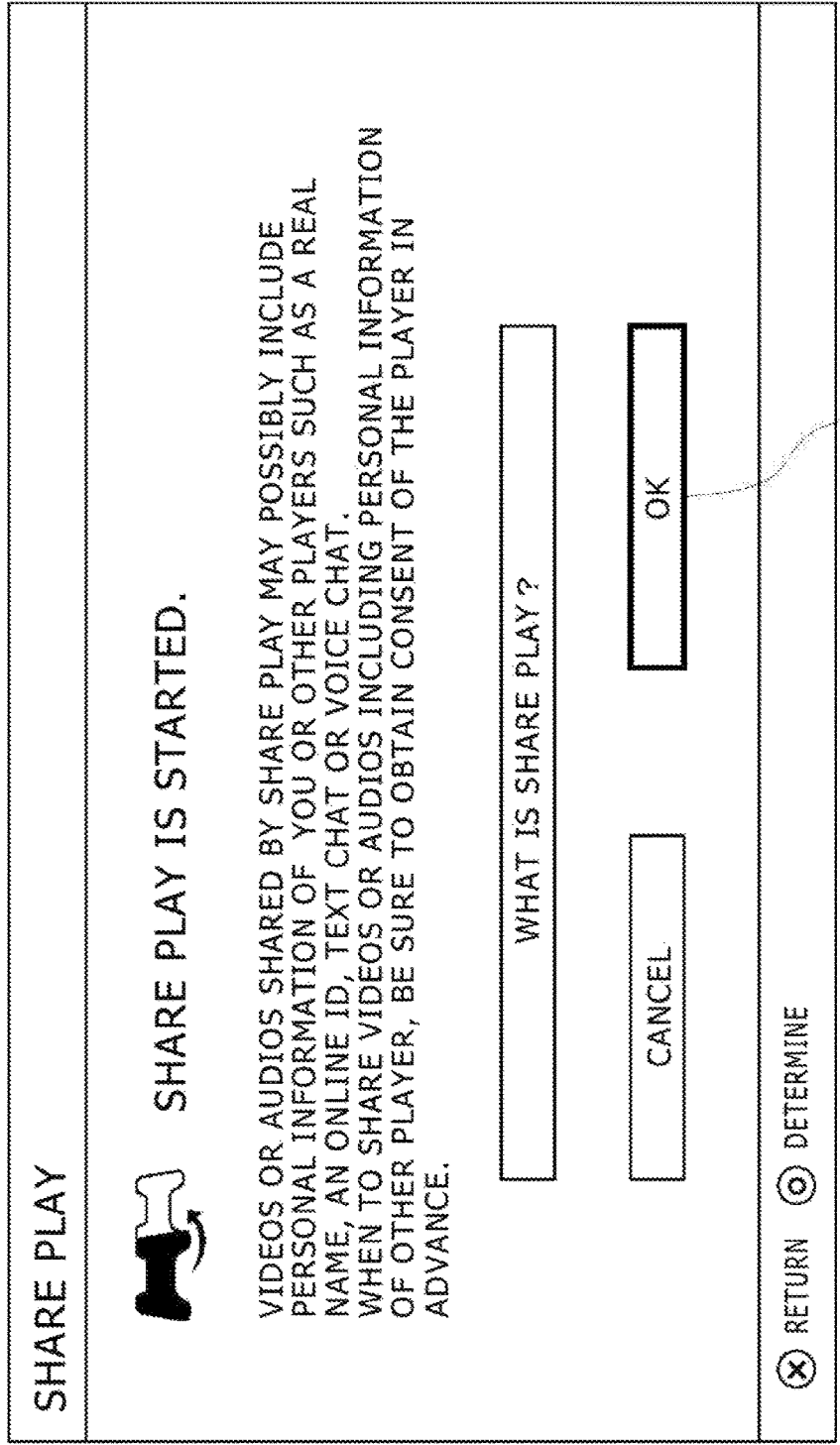
FIG. 12 is a view depicting a starting screen image of shared play.

FIG. 12 depicts a starting screen image of share play. If the user A performs a determination operation for the share play item 420 on the member screen image, then the starting screen image displaying unit 126a displays a starting screen image for share play. In the starting screen image, a note when share play is to be performed is displayed. If the user A moves a focus frame 430 to select an "OK" button, then starting conditions for share play in which the user A acts as the host user are established and a state in which participation of other users is waited is entered. At this point of time, the share application for performing a sharing process of a game image is activated to implement the functions of the sharing processing unit 140a. It is to be noted that if "WHAT IS SHARE PLAY?" is selected, then an explanation screen image of share play is displayed.

FIG. 13 depicts an explanation screen image of share play. In the explanation screen image, it is described that two users who participate in the same chat room individually can act as the host or the guest to perform share play and that the three modes described hereinabove are available as a mode of share play.

If the user A selects the "OK" button on the starting screen image of share play depicted in FIG. 12, then the member screen image displaying unit 124a displays a member screen image.

Figure 14:
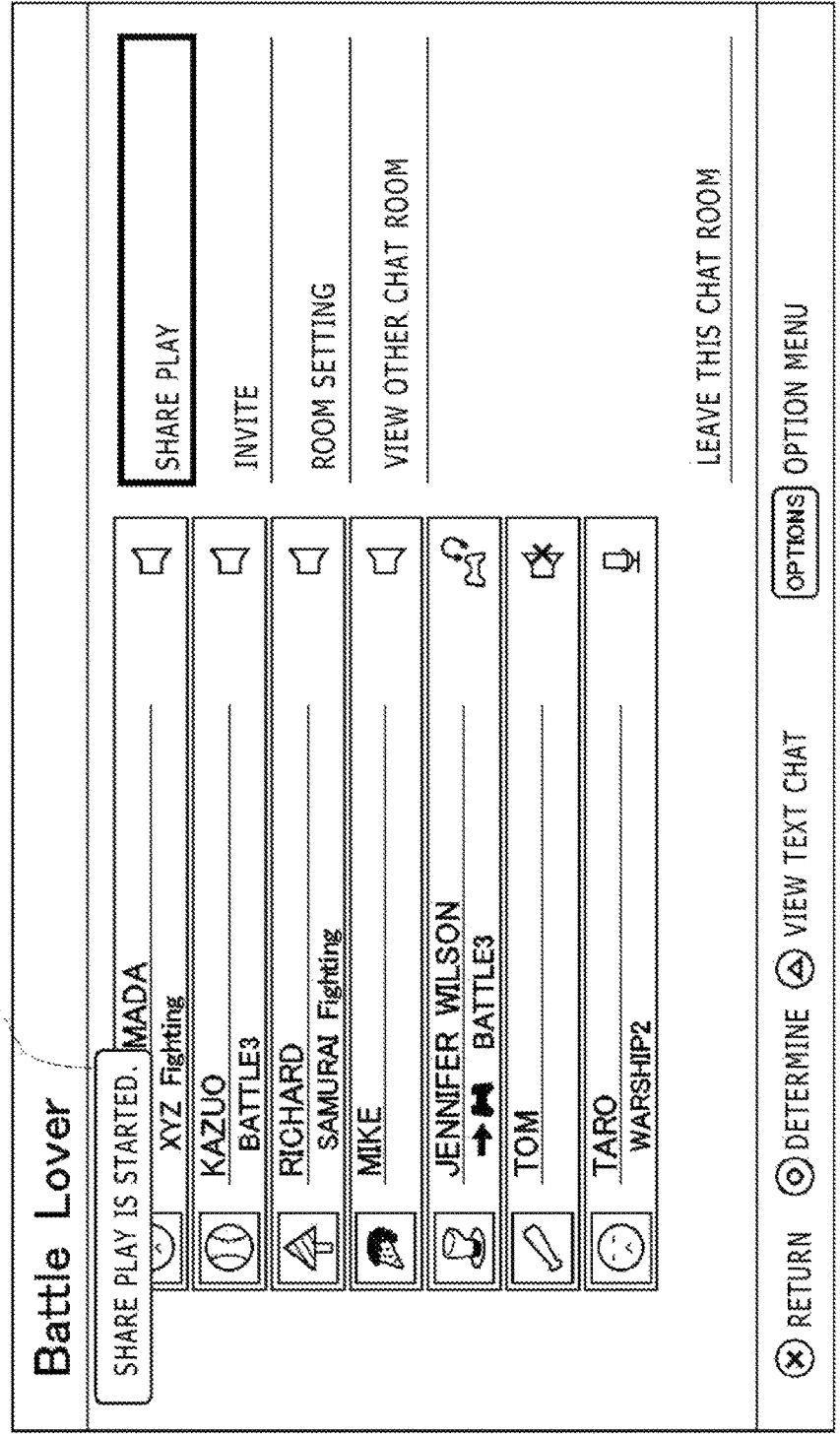
FIG. 14 is a view depicting a member screen image.

FIG. 14 depicts the member screen image. The notification unit 146a displays a starting message 432 on the member screen image in order to indicate that starting conditions of share play are satisfied. The starting message 432 may be displayed, for example, for several seconds after the display screen image changes over to the member screen image and then may be non-displayed.

The notification unit 128a notifies the members of "Battle Lover," namely, the other members who participate in the same chat room, of a message representing that the user A has started the share play. Consequently, the other members can know that the user A has started the share play. It is to be noted that the share play is not actually started before participation of other users is permitted, and accordingly, the message representing that the user A has started the share play signifies that the user A wants share play and is in a state in which the user A waits for participation of other users.

Now, processing by the information processing apparatus 10c of the user C is described with reference to FIG. 6. Here, it is assumed that the user C is a member participating in "Battle Lover" and is the user "RICHARD" in FIG. 14. As depicted by the member screen image of FIG. 14, the user C is playing "SAMURAI Fighting" by itself while performing voice chat.

Referring to FIG. 6, in the information processing apparatus 10c, the content execution unit 170c is executing the game title "SAMURAI Fighting."

Figure 15:
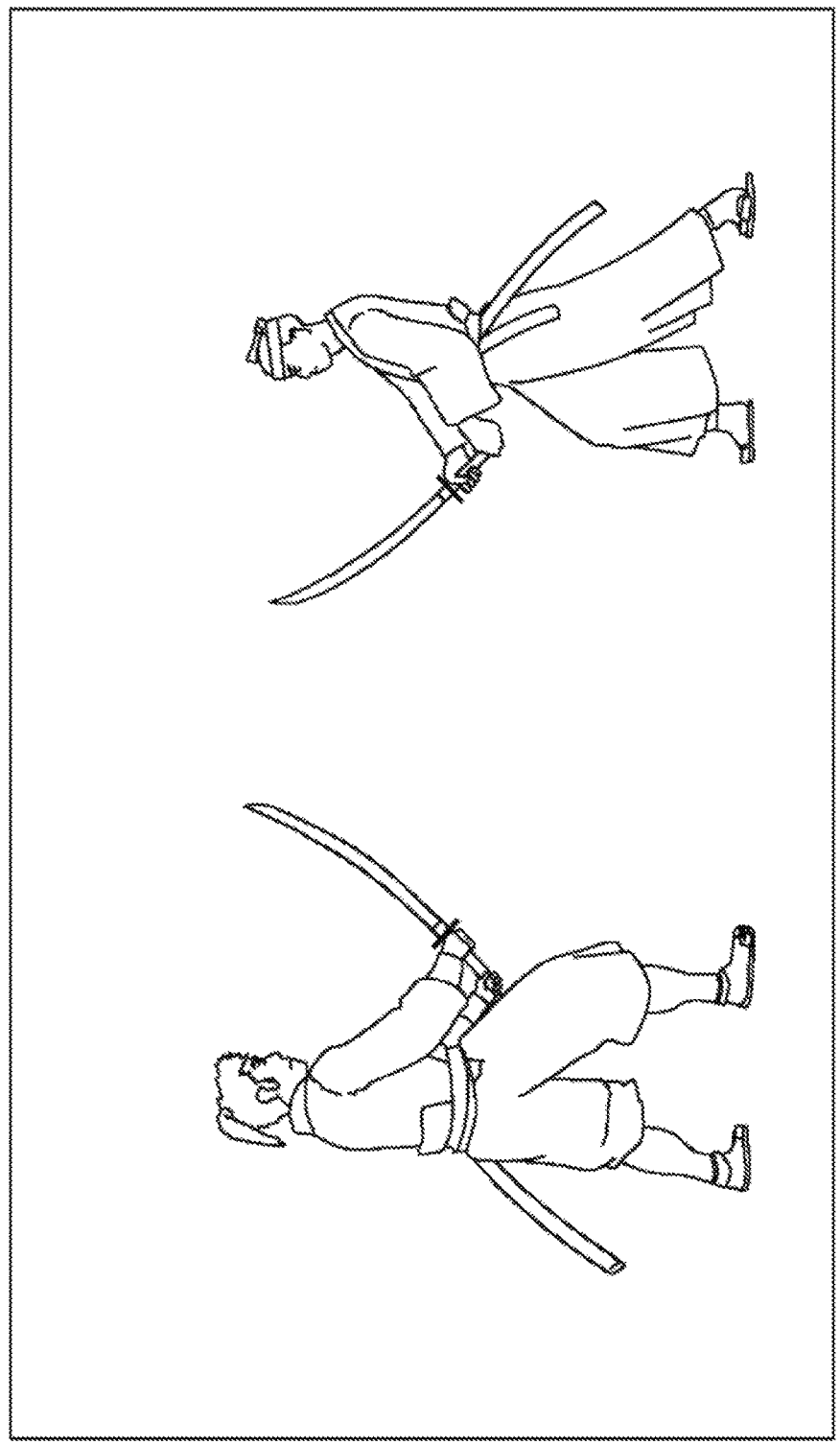
FIG. 15 is a view depicting a game screen image displayed on an outputting apparatus of a user C.

FIG. 15 depicts a game screen image displayed on the outputting apparatus 4c of the user C. The user C is enjoying the game by itself while activating the chat application. Accordingly, the user C is in a state in which, while the user C is playing "SAMURAI Fighting," the user C can perform voice chat with the other members participating in "Battle Lover."

If the user C is notified of a starting message of share play from the information processing apparatus 10a while the user C is playing a game, then the information acquisition unit 122c in the information processing apparatus 10c acquires the message conveyed thereto from the information processing apparatus 10a of the user A. The notification unit 128c displays the acquired message on the game screen image displayed on the outputting apparatus 4c.

Figure 16:
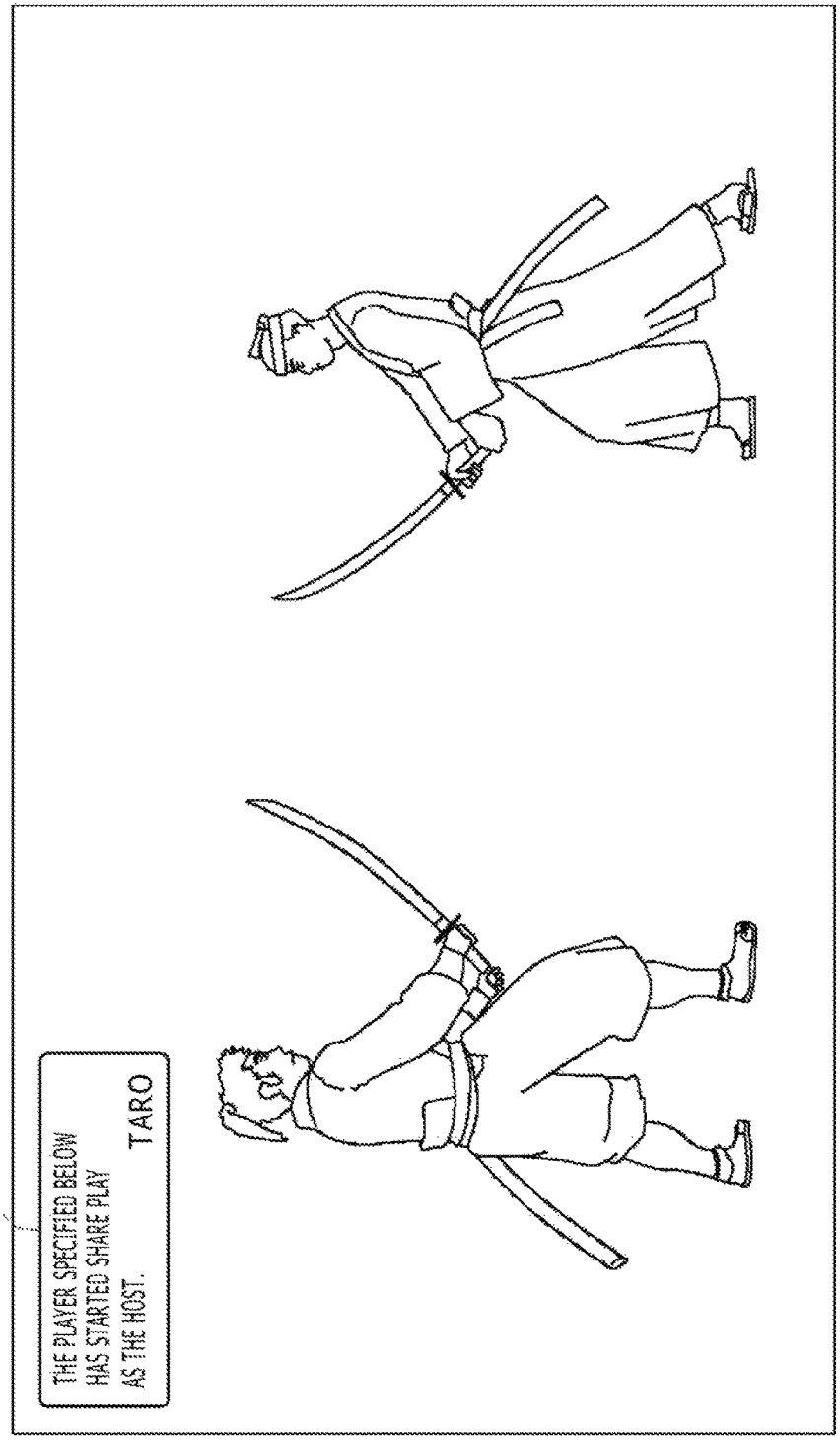
FIG. 16 is a view illustrating a starting message displayed in an overlapping relationship on the game screen image.

FIG. 16 depicts a starting message 434 displayed in an overlapping relationship on the game screen image. The notification unit 128c displays, as the starting message 434, that share play is started and the host user name of the share play. Consequently, the user C can know that "TARO" who is the user A has started share play. It is to be noted that, if the message transmitted from the information processing apparatus 10a includes the game title name being played by the user A, then the notification unit 128c may display the starting message 434 including the game title name being played by the user A. The notification unit 128c displays the starting message 434 for a predetermined period of time, for example, for approximately ten seconds. It is to be noted that, if the user C is viewing a display screen image such as the home screen image generated by the system screen image generation unit, then the notification unit 128c displays the starting message 434 in an overlapping relationship on the display screen image.

Although it is described here that the starting message 434 is displayed in an overlapping relationship on the screen image of the outputting apparatus 4c which is used by the user C, the starting message 434 is displayed in an overlapping relationship not only on the screen image of the outputting apparatus 4c of the user C but also on the screen image of the outputting apparatus 4 of the other members than the user A of "Battle Lover." As described hereinabove, at the point of time at which the starting message 434 is displayed, the user A (TARO) is in a state in which it waits for starting of share play, and the starting message 434 is recognized as a message for the notification that participation in the share play is permitted. Here, the participation in the share play is implemented by a participation request transmitted from a member to and accepted by the information processing apparatus 10a of the user A. In other words, a member can participate in the share play, in a sense, in a first come, first served fashion.

If the user C operates a predetermined button of the inputting apparatus 6c, then the information acquisition unit 122c acquires user information of the room members, namely, user information such as the user name and the user icon of each member, the game title and the game icon of the game being played, and a chat situation. Then, the member screen image displaying unit 124c generates a member screen image of the chat room on the basis of the user information acquired by the information acquisition unit 122c and displays the member screen image on the outputting apparatus 4c.

Figure 17:
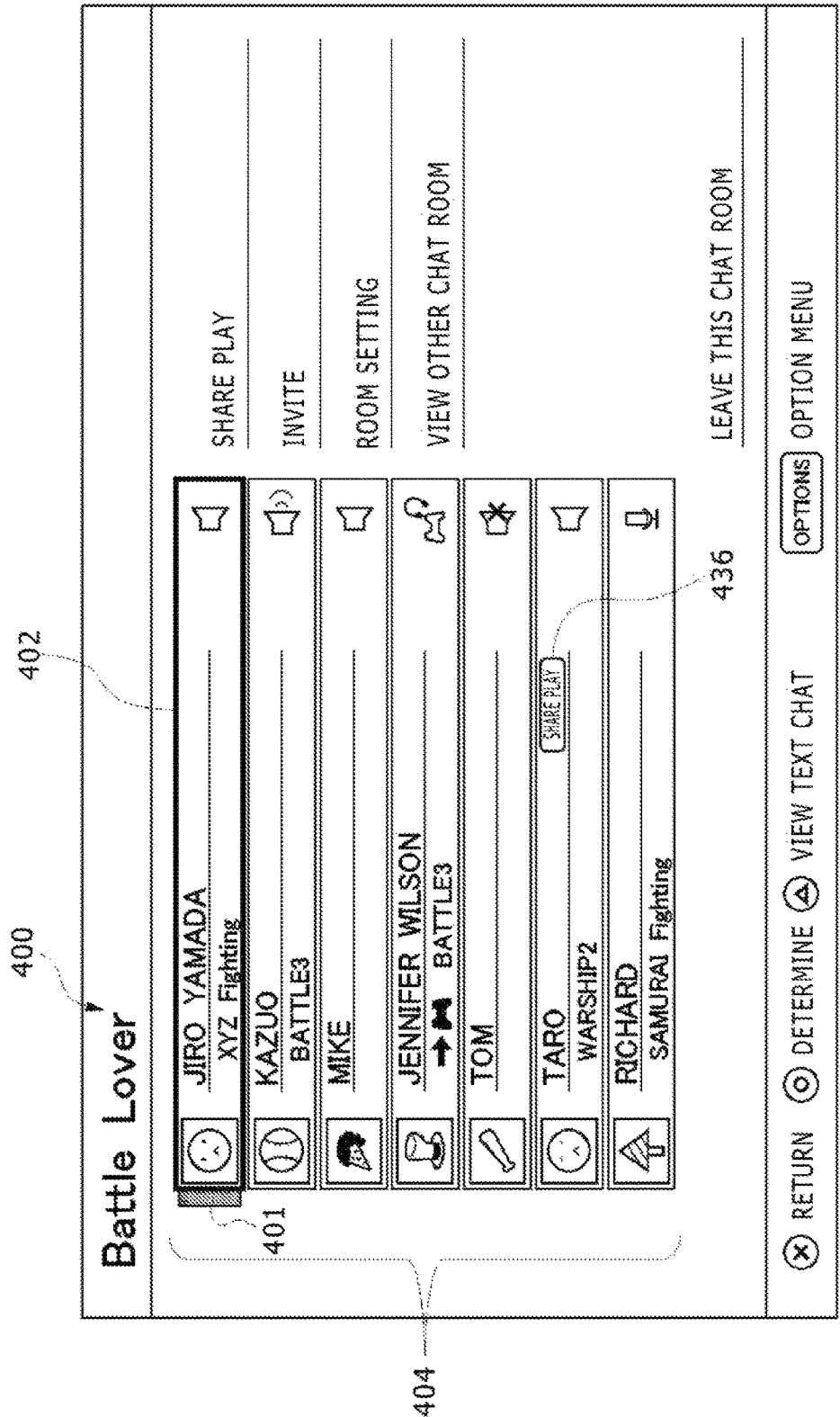
FIG. 17 is a view depicting an example of a member screen image of a chat room.

FIG. 17 depicts an example of the member screen image of a chat room. At the top stage of the member screen image, the room name 400 is displayed. The member screen image displaying unit 124c displays, in the member information area 404 set to the left side in the member screen image, user information regarding the other members acquired by the information acquisition unit 122c in the form of a list together in a juxtaposed relationship with the own user information. In the member information area 404, at the uppermost stage, the user information of the room owner by whom the room has been established is displayed, and the owner indicator 401 indicating the owner is added. Meanwhile, at the lowermost stage, the information of the user C itself (namely, RICHARD) is displayed.

In the user information displaying field of the user A, a share play indicator 436 indicating that share play is possible is displayed. By confirming the share play indicator 436, the user C recognizes that "TARO" who is the user A is in a state in which it can perform share play.

Figure 18:
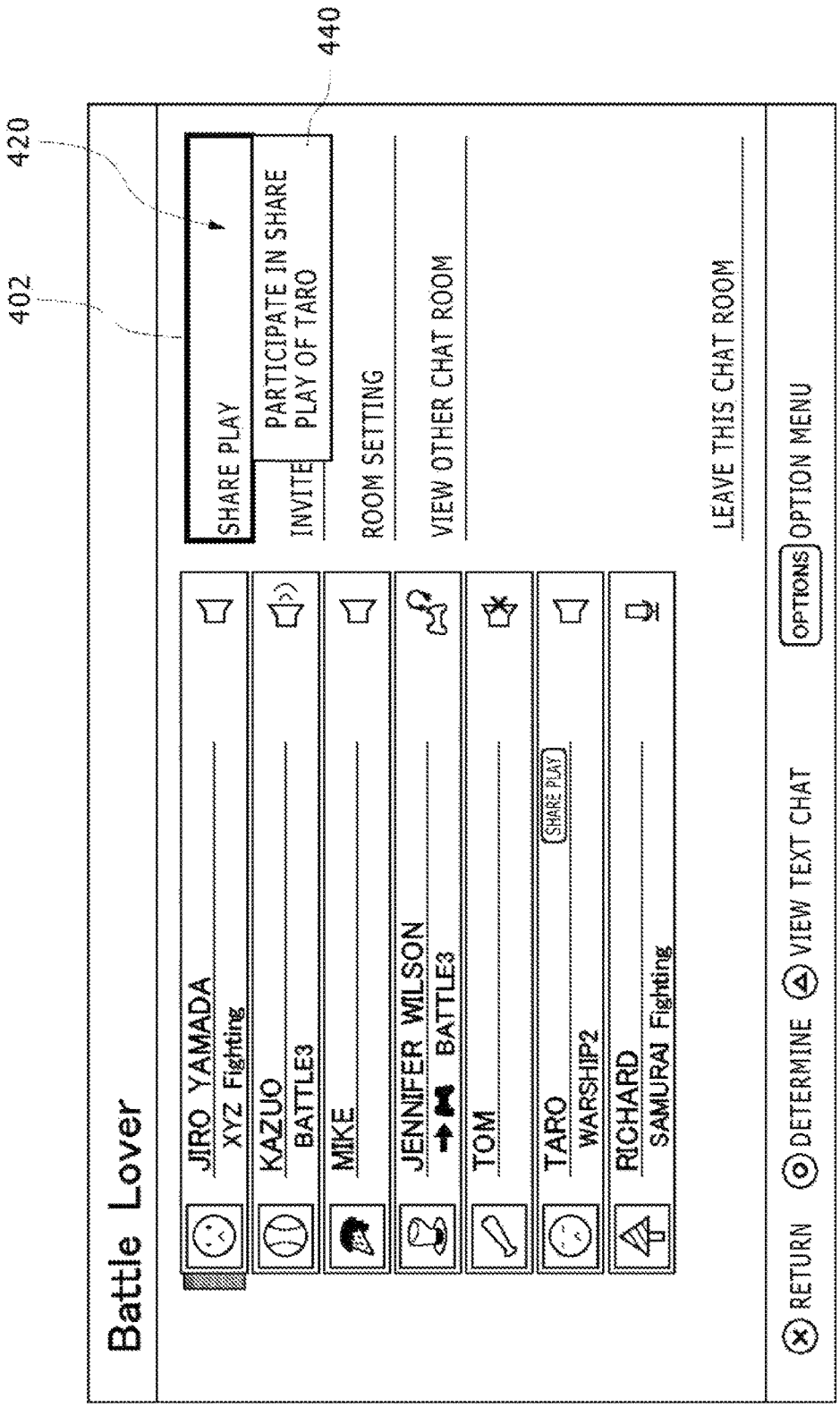
FIG. 18 is a view depicting a selection item displayed when a determination operation is performed with the focus frame placed on the shared play item.

FIG. 18 depicts a selection item displayed when a determination operation is performed with the focus frame 402 placed on the share play item 420. The selection item is a participation GUI (Graphical User Interface) 440 for selecting to participate in share play. If the user C places the focus frame 402 on the participation GUI 440 and operates the determination button, then the notification unit 128c transmits a participation request to the information processing apparatus 10a to propose participation in the share play of the user A.

Figure 19:
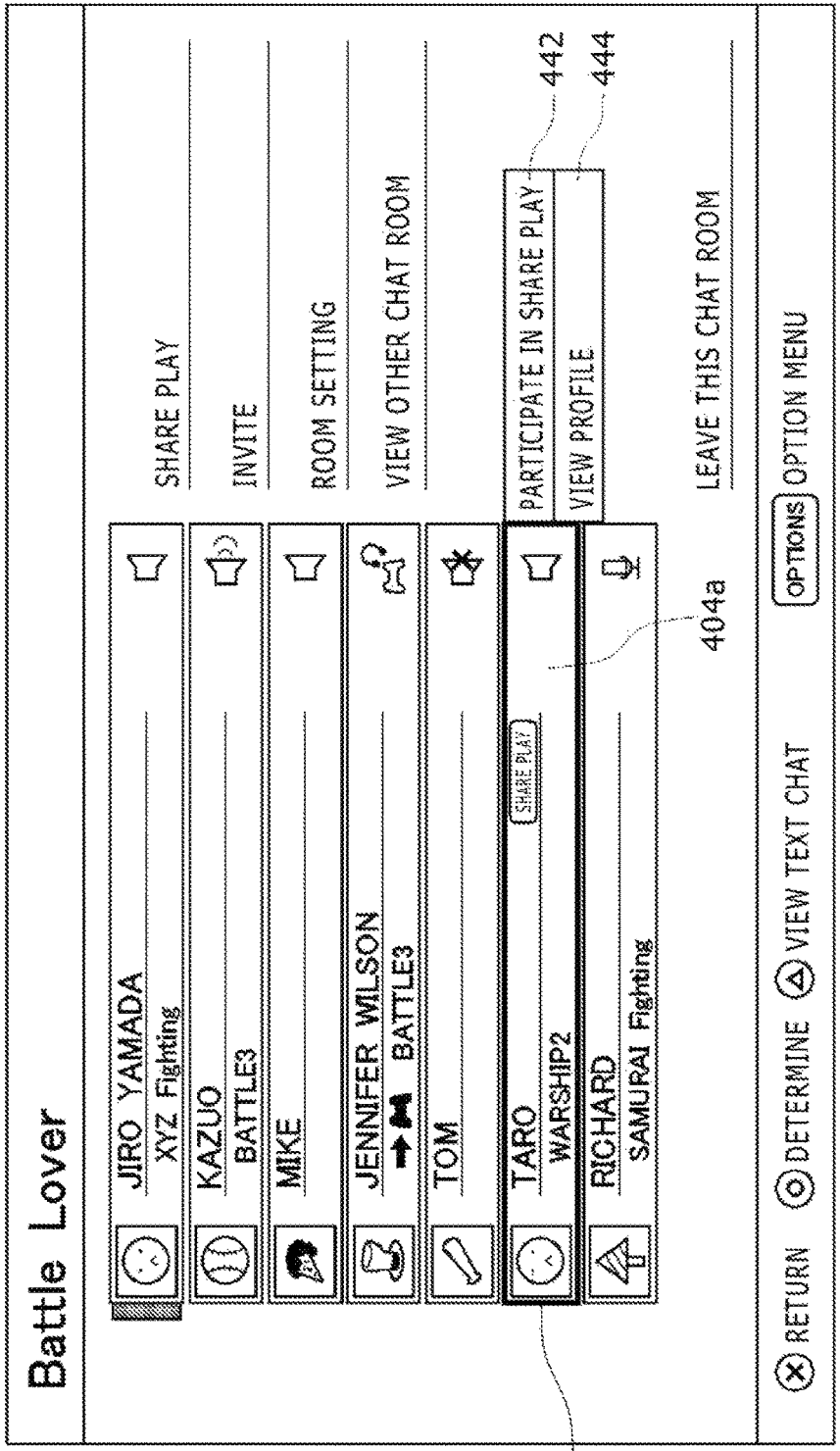
FIG. 19 is a view illustrating a selection item displayed when a determination operation is performed with the focus frame placed in an information display field of a user A.

FIG. 19 depicts a selection item displayed when the determination operation is performed with the focus frame 402 placed on an information displaying field 404a of the user A. This selection item includes a participation GUI 442 for selecting participation in the share play and a profile GUI 444 for selecting browsing of the profile of "TARO." If the user C places the focus frame 402 on the participation GUI 442 and operates the determination button, then the notification unit 128c transmits a participation request to the information processing apparatus 10a to propose participation in the share play of the user A. At this time, the information processing apparatus 10c inquires the management server 5 about a viewing age limit or the like to the game and voluntarily decides that the age of the user C clears the viewing limit and so forth to notify the information processing apparatus 10a that the user C is permitted to participate in the game.

After the information processing apparatus 10c voluntarily decides that the user C is permitted to participate in the game, it activates the share application to implement the functions of the sharing processing unit 140c. Consequently, the sharing processing unit 140c enters a state in which it waits for distribution of game image data from the information processing apparatus 10a.

Meanwhile, in the information processing apparatus 10a, the content execution unit 170a processes the game program on the basis of operation information inputted to the inputting apparatus 6a by the user A to generate image data of the game. Here, the content execution unit 170a may be the content (game program) itself.

If the information acquisition unit 142a acquires the information indicating that the participation of the user C is permitted from the information processing apparatus 10c, then the sharing execution unit 144 sets the mode of the share play to be executed to the share play 1 (share screen). As described hereinabove, the share play 1 is a mode in which an operation from the user C is not accepted while only distribution of game image data is performed, and is selected by default by the sharing execution unit 144. The sharing execution unit 144 notifies the control right management unit 156 of the selected mode. The control right management unit 156 manages the control right of the content, namely, the control right of the game, and if control right management unit 156 is notified that the sharing mode is the share play 1, then it operates so as to ignore operation data from the user C.

FIG. 20 depicts an example of a game screen image displayed on the outputting apparatus 4a. If the information acquisition unit 142a acquires information representing that participation of the user C is permitted from the information processing apparatus 10c, then the notification unit 146a displays a participation notification message 435 which indicates that a guest user has participated into the share play in an overlapping relationship with the game screen image. Consequently, the user A can know that "RICHARD" has participated into the share play.

If the sharing execution unit 144 sets the sharing mode of a game image to the share play 1 (share screen), then the distribution processing unit 180 transmits game image data to the information processing apparatus 10c together with information for specifying the set sharing mode (mode information). Preferably, the transmission of game image data is performed in synchronism with the outputting to the outputting apparatus 4a such that the user A and the user C can view the same game screen image. In the information processing apparatus 10c, the information acquisition unit 142c acquires the mode information and the image data acquisition unit 150 acquires the image data. The reproduction processing unit 152 reproduces the game image from the outputting apparatus 4c using the acquired image data. Consequently, the user C can view the same game screen image as that of the user A. It is to be noted that the distribution processing unit 180 may be restricted otherwise such that it transmits only the game image data but does not transmit image data other than the game image.

FIG. 21 depicts a game screen image displayed to the user C. The reproduction processing unit 152 performs a reproduction process of the image data and outputs the reproduced image data to the outputting apparatus 4c. At this time, the notification unit 146c displays a state indicator 450 indicative of the mode of the share play in an overlapping relationship with the game screen image on the basis of the mode information. The state indicator 450 is information indicative of the mode of the sharing process and is conveyed to the user C in an associated relationship with the reproduced game screen image. Here, the state indicator 450 indicates that the mode of the sharing process is the share play 1. Here, the state indicator 450 is a text message "THE PLAY OF THE HOST IS BEING VIEWED," the massage may include also the user name and may be a message, for example, "THE PLAY OF TARO IS BEING VIEWED" or "THE PLAY OF TARO OF THE HOST IS BEING VIEWED."

After the share play is started, if the user A operates a predetermined button, then the member screen image displaying unit 124a displays a member screen image of the chat room on the outputting apparatus 4a.

Figure 22:
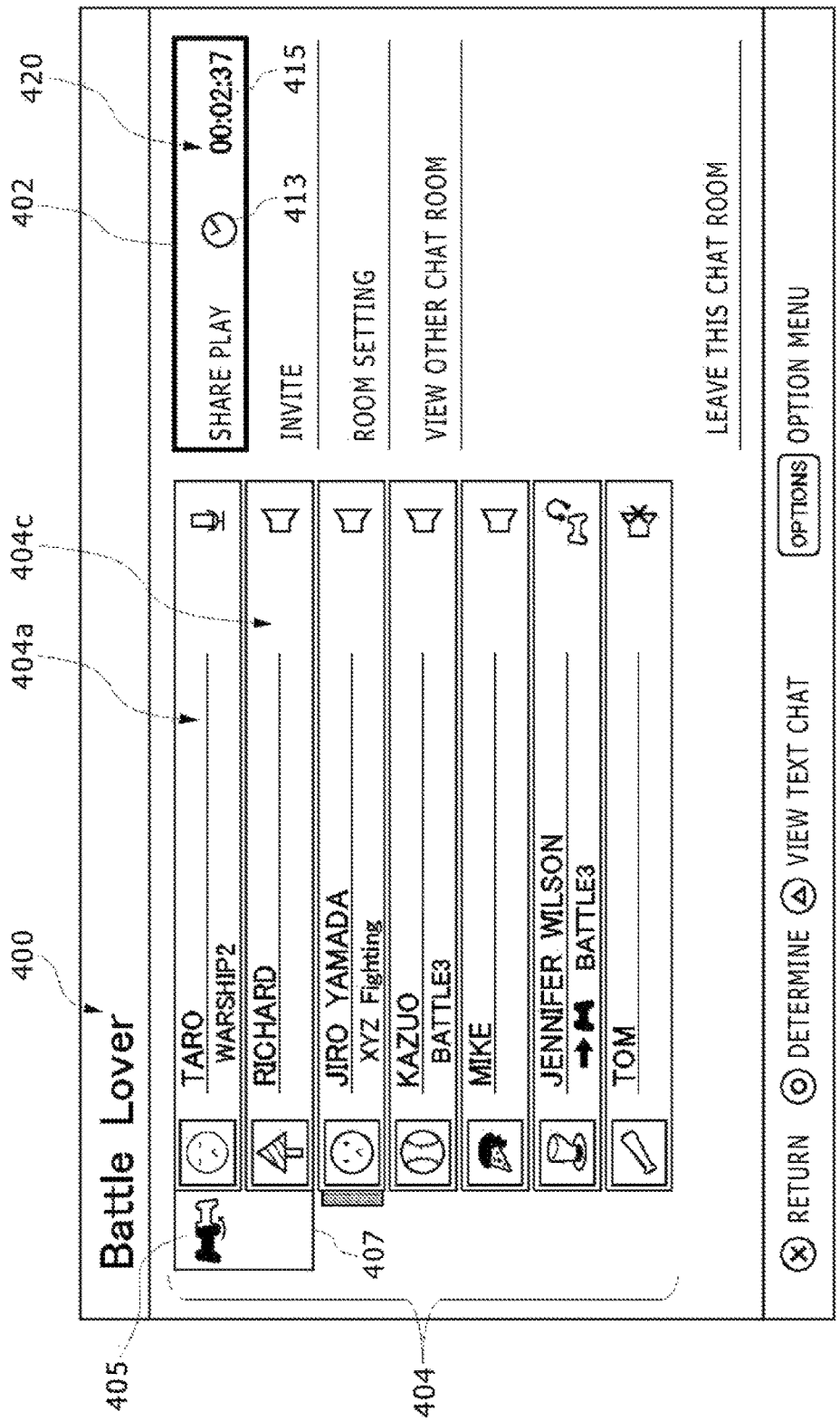
FIG. 22 is a view depicting an example of a member screen image of a chat room.

FIG. 22 depicts an example of a member screen image of a chat room. The member screen image depicted in FIG. 22 is to the user A. The information acquisition unit 122a acquires user information of the room members, in particular, information of the user name and the user icon of each member, the game title and the game icon being played, a chat situation and so forth. Then, the member screen image displaying unit 124a generates a member screen image of the chat room on the basis of the user information acquired by the information acquisition unit 122a and displays the member screen image on the outputting apparatus 4a.

The information acquisition unit 122a issues an inquiry about the share play to the sharing processing unit 140a and acquires, from the sharing processing unit 140a, information indicating that share play in which the user A is the host user and the user C is the guest user is being executed. In response to the information, the member screen image displaying unit 124a displays the user information such that it can be specified which user is the host user or the guest user. Here, the member screen image displaying unit 124a places an information displaying field 404a for the host user and an information displaying field 404c for the guest user are placed in a continuously juxtaposed relationship with each other in the member information area 404.

As depicted in FIG. 22, the member screen image displaying unit 124a displays the information displaying field 404a of the user A and the information displaying field 404c of the user C in a juxtaposed relationship such that the information displaying field 404a is positioned just above the information displaying field 404c. It is to be noted that the member screen image displaying unit 124a may place the information displaying field 404a of the host user at the uppermost position in the member information area 404. It is to be noted that, on the member screen image of any one of the users participating in the same chat room, the user information of the host user and the guest user is placed such that they are positioned at the uppermost position and the second uppermost position, respectively. Preferably, on the member screen image of a user who does not participate in share play, the other user information is displayed such that it can be specified which user other than the user itself is the host user or the guest user. Accordingly, since the user information of the host user is placed at the uppermost position and the user information of the guest user is placed at the second uppermost position, any member can readily confirm which two users are performing share play.

A share play mark 405 indicating the host user is added in an associated relationship with the information displaying field 404a of the host user. Further, in order to clearly indicate that "TARO" and "RICHARD" are carrying out share play, also a link 407 may be added so as to display the information displaying field 404a and the information displaying field 404c in an associated relationship with each other. Consequently, any member of the chat room can readily confirm the two users who are performing share play.

In the share play item 420, a check mark 413 indicating that share play is being performed is displayed and time information 415 indicative of a carrying out time period of the share play is displayed. In the sharing processing unit 140a, the time measurement unit 164 measures the carrying out time period of the sharing process (share play) of a game image between the host user and the guest user. In the present embodiment, the upper limit to the carrying out time period of the share play is set to a predetermined time period (for example, 60 minutes). The sharing execution unit 144 acquires the measurement time period from the time measurement unit 164, and if the carrying out time period reaches the predetermined time period (60 minutes), then the sharing execution unit 144 automatically ends the share play. The sharing execution unit 144 notifies the member screen image displaying unit 124a of the carrying out time period of the share play measured by the time measurement unit 164. Accordingly, the member screen image displaying unit 124a can display the time information 415 indicative of the carrying out time period of the share play in the display field of the share play item 420.

If the time information 415 indicates a period of time proximate to 60 minutes, then any other member in "Battle Lover" recognizes that the share play of the user A (TARO) and the user C (RICHARD) is likely to end, and a user who wants to perform share play with TARO after the end may wait for the end of the share play.

If the user A places the focus frame 402 on the share play item 420 and operates the determination button, then choices relating to the share play are displayed.

Figure 23:
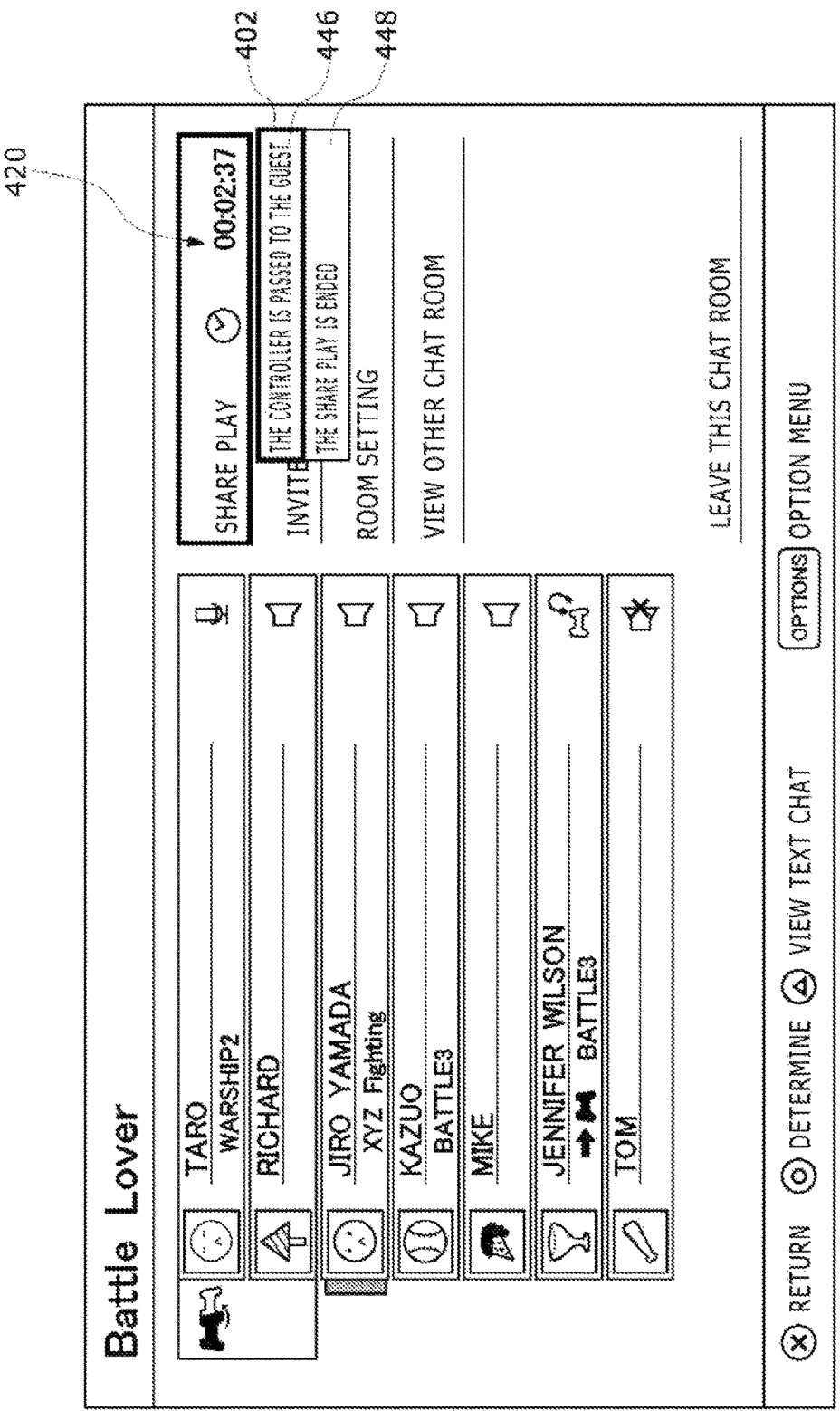
FIG. 23 is a view depicting a selection item displayed when a determination operation is performed with the focus frame placed on the share play item.

FIG. 23 depicts a selection item displayed when a determination operation is performed with the focus frame 402 placed on the share play item 420. The selection item includes a control right provision GUI 446 for selecting to pass the control right of the game in the share play to the guest and an end GUI 448 for selecting to end the share play.

If the user A places the focus frame 402 on the control right provision GUI 446 and operates the determination button, then the dialog screen image displaying unit 162 displays a dialog screen image for allowing the user A to select a mode of share play on the outputting apparatus 4a.

Figure 24:
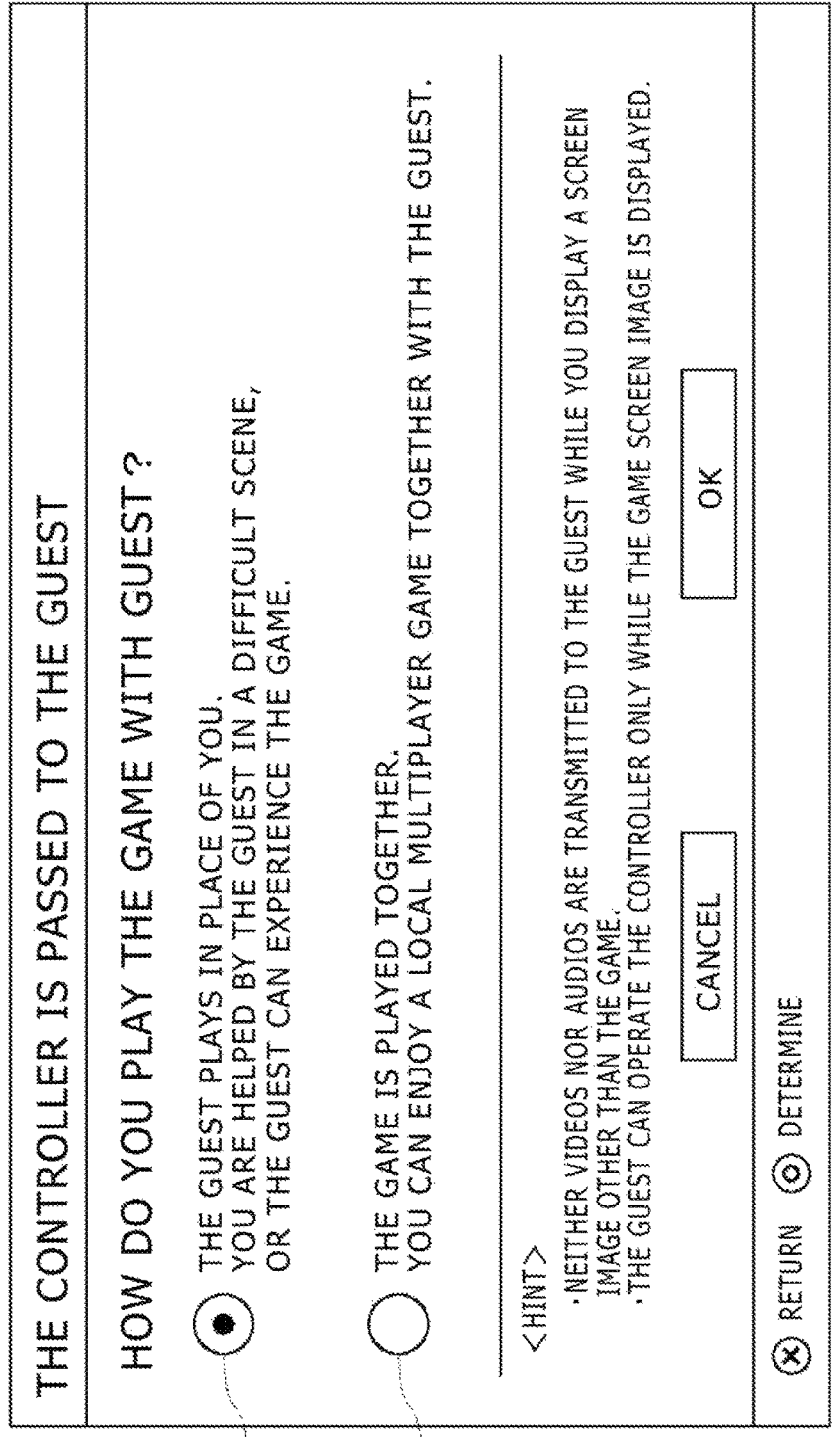
FIG. 24 is a view depicting an example of a dialog screen image.

FIG. 24 depicts an example of a dialog screen image. On the dialog screen image, a radio button is displayed. If a button 449a is selected and an OK button is operated, then the sharing execution unit 144 sets the share play 2, namely, the assist play, as the mode of game image sharing. On the other hand, if another button 449b is selected and the OK button is operated, then the sharing execution unit 144 sets the share play 3, namely, the joint play, as the mode of game image sharing. The sharing execution unit 144 conveys the set mode to the control right management unit 156. Further, if the OK button is operated on the dialog screen image, then the display screen image of the outputting apparatus 4a is changed over to the game screen image. The state acquisition unit 160 detects that the screen image is changed over from the dialog screen image to the game screen image, and the distribution processing unit 180 performs the distribution process of game image data. At this time, the distribution processing unit 180 distributes the game image data to the information processing apparatus 10c together with the information (mode information) for specifying the sharing mode set by the sharing execution unit 144.

If the sharing execution unit 144 sets the share play 2 as the sharing mode, then the information acquisition unit 142c in the information processing apparatus 10c acquires the mode information and the image data acquisition unit 150 acquires the image data. The reproduction processing unit 152 performs a reproduction process of the image data and outputs the resulting image data to the outputting apparatus 4c.

Figure 25:
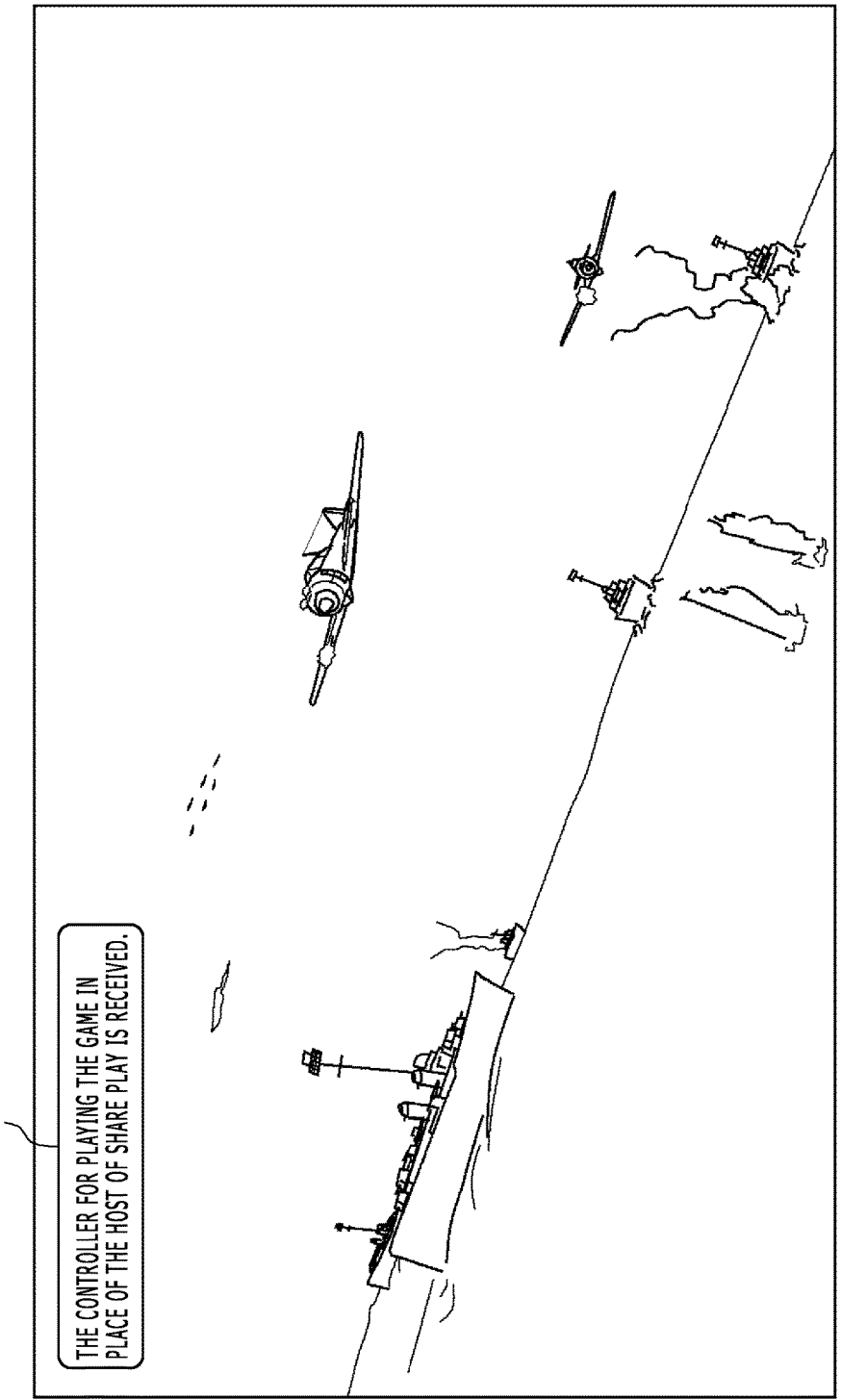
FIG. 25 is a view depicting a game screen image displayed to the user C.

FIG. 25 depicts a game screen image displayed to the user C. The reproduction processing unit 152 performs a reproduction process of the image data and outputs the resulting image data to the outputting apparatus 4c. At this time, the notification unit 146c displays a control right provision message 454 on the basis of the mode information to notify the user C that the control right of the game is passed to the user C from the user A.

In the share play 2, the user C can operate the inputting apparatus 6c to play the game. The operation information of the inputting apparatus 6c by the user C is accepted by the acceptance unit 104c and is transmitted from the operation data transmission unit 154 to the information processing apparatus 10a.

In the information processing apparatus 10a, the information acquisition unit 142a accepts operation information of the inputting apparatus 6c by the user C. The control right management unit 156 manages the control right of the game in response to the mode of the share play, and during execution of the share play 2, the control right management unit 156 ignores operation information by the user A and validates only the operation information by the user C. If the user A has played as the player 1 in a game before the share play is started, the control right management unit 156 handles the operation information by the user C as valid operation information from the player 1 and handles the operation information by the user A as invalid operation information.

In this manner, during execution of the share play 2, the control right management unit 156 discards the operation information of the user A accepted by the acceptance unit 104a and validates the operation information of the inputting apparatus 6c by the user C acquired by the information acquisition unit 142*a*. Then, the control right management unit 156 causes the operation data provision unit 158 to provide operation information of the user C as operation information of the player 1 therefrom to the content execution unit 170*a*. Consequently, during execution of the share play 2, the game program recognizes the operation information of the user C as the operation information of the player 1 to proceed with the game.

It is to be noted that a game sometimes provides feedback information to the inputting apparatus 6 of the player in response to a progress situation. For example, while a car operated by the player travels on a gravel road in a car race game, the oscillator of the game controller may be caused to oscillate to provide a sense of traveling on a gravel road to the player.

The inputting apparatus 6 has, as the control target units which can be controlled by a game, the light emitting unit 85, oscillator 98 and speaker 99. The game outputs, in response to the progress situation of the game, turning on control data for turning on the light emitting unit 85, oscillation control data for causing the oscillator 98 to oscillate and sound control data for causing the speaker 99 to output sound. While, in the following description, the turning on control data, oscillation control data and sound control data are collectively referred to as "control data," the control data may otherwise be one, two or more of the control data mentioned.

The game outputs control data to the player. The control data acquisition unit 166 acquires control data for the control target units of the inputting apparatus 6 from a content (game) being executed by the content execution unit 170*a*. Here, during execution of share play 2, the control right management unit 156 causes the control data provision unit 168 to provide control data of the game as feedback information to the player therefrom to the inputting apparatus 6*c* of the user C. It is to be noted that the control data provision unit 168 may cause the control data to be transmitted to the information processing apparatus 10*c* through the distribution processing unit 180 so as to be provided to the inputting apparatus 6*c* used by the user C. In this manner, since the user C plays the game as player 1 in place of the user A during execution of the share play 2, preferably the control data acquisition unit 166 provides the control data from the game to the inputting apparatus 6*c* of the user C. Consequently, the user C can receive feedback from the game through oscillation, light emission or sound generated by the inputting apparatus 6*c*, and the presence of the game can be raised. In this manner, in the share play 2, preferably control data from the game is provided to the inputting apparatus 6 of the guest user to control the control target units of the inputting apparatus 6.

It is to be noted that the control data provision unit 168 may provide the control data not only to the inputting apparatus 6*c* of the user C but also to the inputting apparatus 6*a* of the user A. In the share play 2, although the user A who is the host user does not have the control right of the game, commonly to the user C, the user A is viewing the game screen image operated by the user C who is the guest user. Especially, since the share play 2 is executed in such a situation that such a difficult scene as cannot be cleared by the user A is played by the user C in place of the user A, the user A desires such a sense that the user A is playing together. Therefore, the control data provision unit 168 provides the control data also to the inputting apparatus 6*a* of the user A such that the inputting apparatus 6*a* of the user A is controlled with the control data. Consequently, the user A is provided with feedback from the game and can have such a sense that the user A confronts with the difficult scene together with the user C.

It is to be noted that, as a different way of thinking regarding the game feedback, the control data provision unit 168 may provide the control data only to the inputting apparatus 6*a* of the user A without providing the control data to the inputting apparatus 6*c* of the user C. This way of thinking is that, in the share play 2, the user C performs game operation in place of the user A to the end and, while the presence of the game is provided to the user A, such merit may not be enjoyed by the user C who is the guest user.

Now, the share play 3 is described. Where the sharing execution unit 144 sets the share play 3 as the sharing mode, the user C does not have a user account for login in the information processing apparatus 10*a*. The information processing apparatus 10*a* cannot play a game if a user does not log in thereto as described hereinabove. It is to be noted that, in the share play 2 described above, the login user is the host user to the end, and the guest user only performs game operation of the host user in place of the host user and is not necessitated to log in to the information processing apparatus 10*a*. The share play 3 is different in this situation, in the share play 3, and since the guest user participates as a new player in the information processing apparatus 10*a*, the guest user cannot play a game if it does not log in to the information processing apparatus 10*a*.

Therefore, when the sharing execution unit 144 sets the share play 3 as the sharing mode, the sharing execution unit 144 first creates a temporary user account of the user C automatically and uses the temporary user account to allow the user C to log in to the information processing apparatus 10*a*. This automatic login may be performed while the user C is not conscious of this.

The information processing apparatus 10*a* does not permit storage of save data or acquisition of a trophy to the guest user who logs in with the temporary user account. This temporary user account is deleted automatically when the share play 3 comes to an end, and accordingly, even if save data is automatically stored by the game or a trophy is acquired, such save data and trophy are automatically deleted by deleting the temporary user account.

Since the sharing execution unit 144 of the information processing apparatus 10*a* creates a temporary user account, the user C can log in to the information processing apparatus 10*a* and participate in the share play 3. In the information processing apparatus 10*c*, the information acquisition unit 142*c* acquires mode information and the image data acquisition unit 150 acquires image data. The reproduction processing unit 152 performs a reproduction process for the image data and outputs the resulting image data to the outputting apparatus 4*c*.

Figure 26:
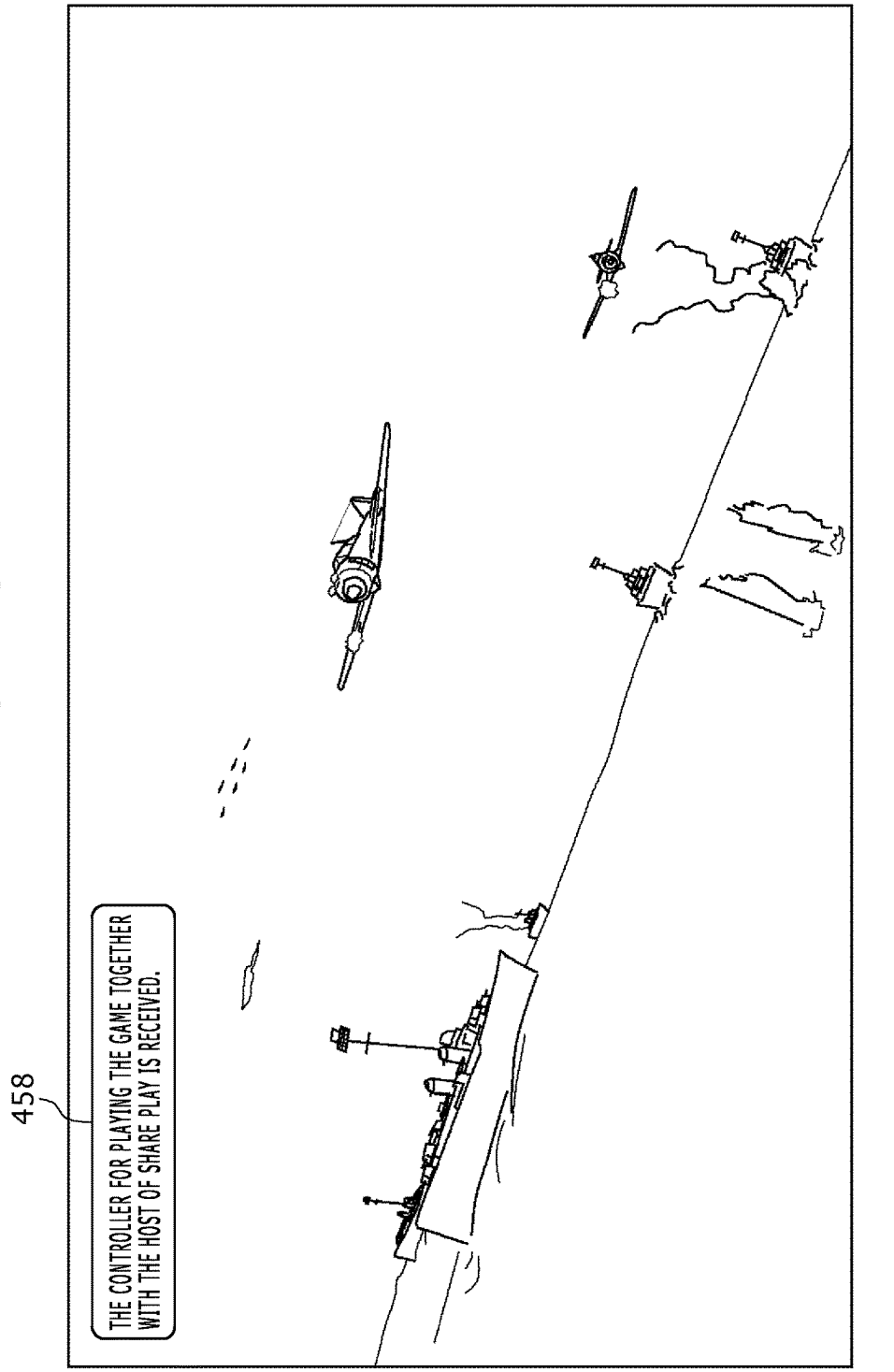
FIG. 26 is a view depicting another game screen image displayed to the user C.

FIG. 26 depicts a game screen image displayed to the user C. The reproduction processing unit 152 performs a reproduction process of the image data and outputs the resulting image data to the outputting apparatus 4*c*. At this time, the notification unit 146*c* displays a control right provision message 458 on the basis of the mode information to notify the user C that the control right of the game is passed to the user C.

It is to be noted that, in the share play 3, both of the user A and the user C have the control right of the game, and accordingly, the game is notified that a new user has been added. It is to be noted that, in the case of a game in which a user operates a player character, at the stage at which the user C receives the control right provision message 458, the user C does not yet generate a player character of itself in the game. Therefore, the user C will select an own player character anew in response to a request from the game to participate in the game. For example, a case in which, in a game, the user A plays as the player 1 and the user B participates as the player 2 is described.

In the information processing apparatus 10a, the control right management unit 156 manages the control right of the game in accordance with the mode of the share play, and during execution of the share play 3, the control right management unit 156 handles operation information by the user A as operation information of the player 1 and handles operation information by the user C as operation information of the player 2.

In this manner, during execution of the share play 3, the control right management unit 156 causes the operation data provision unit 158 to provide operation information of the inputting apparatus 6a by the user A accepted by the acceptance unit 104a as operation information of the player 1 therefrom to the content execution unit 170a. Further, the control right management unit 156 causes the operation data provision unit 158 to provide operation information of the inputting apparatus 6c by the user C acquired by the information acquisition unit 142a as operation information of the player 2 therefrom to the content execution unit 170a. Consequently, during execution of the share play 3, the game program recognizes operation information of the user A as operation information of the player 1 and recognizes operation information of the user C as operation information of the player 2 to proceed with the game.

As described hereinabove, the time measurement unit 164 measures the carrying out time period of the share play. The carrying out time period of the share play is a time period during which continuation time period is measured beginning with a start point which is a point of time at which the share play 1 is started. The upper limit to the carrying out time period of the share play is set to a predetermined period of time (for example, 60 minutes), and when the remaining time period becomes, for example, five minutes, the notification unit 146a may notify the user A by displaying on the game screen image that the remaining time period is five minutes. It is to be noted that the information of the remaining time period may be transmitted also to the information processing apparatus 10c such that it is displayed also on the game screen image being viewed by the user C that the remaining time period is five minutes.

The sharing execution unit 144 acquires a measurement time period from the time measurement unit 164, and if the measurement time period reaches the predetermined period of time (60 minutes), then the sharing execution unit 144 ends the share play 3 automatically. When the share play 3 is ended, the sharing execution unit 144 discards the temporary user account created for the user C. Consequently, the user C is logged out from the information processing apparatus 10a, and in such a case that save data and so forth have been automatically stored by the game, also the stored save data and so forth are discarded.

It is to be noted that the information processing apparatus 10a and the information processing apparatus 10c are connected to each other through the network 3. Although a network failure can be caused by various reasons, a network failure sometimes occurs during execution of share play, resulting in cutting of connection between the information processing apparatus 10a and the information processing apparatus 10c. The connection situation is monitored, for example, by the system software and is notified from the system software to the sharing processing unit 140a.

Here, if a notification that the connection between the information processing apparatus 10a and the information processing apparatus 10c is cut is issued to the sharing processing unit 140a during execution of the share play 3, then the time measurement unit 164 temporarily stops the measurement of the carrying out time period. For example, if the continuation time period of the share play is 35 minutes at the point of time at which the connection is cut, then the time measurement unit 164 temporarily stops the timer and retains the carrying out time period (35 minutes) into a buffer. At this time, the sharing execution unit 144 keeps the temporary user account of the user C in the retained state without discarding the same.

As described above, in the information processing apparatus 10a, a game cannot be played if a user is not in a login state. Therefore, if the user account of the user C is discarded, then the user C is logged out inevitably from the information processing apparatus 10a, and the game recognizes that the player 2 has disappeared and deletes the data relating to the player 2. However, since the cut connection is sometimes restored, the sharing execution unit 144 maintains the user account of the user C without discarding the same and waits that the connection is restored. It is to be noted that, although the user C participates as the player 2 in the game at this time, since naturally the operation information from the user C is not provided to the game, the player character operated by the player 2 is in a non-operated state (in other words, in an upwardly standing state) in the game. It is to be noted that, since operation information from the user A can be provided to the game, the player character operated by the player 1 can operate in response to operation information from the user A.

While a game image is being streaming-distributed by share play, the sharing execution unit 144 does not accept participation of a different user in the share play. Although it has been described with reference to FIG. 18 or FIG. 19 that, in order to participate in share play, a user interface (participation GUI 440 or GUI 442) for participation prepared in a member screen image of a chat room is used, during execution of the share play, originally a user interface for participation is not provided to the room members, and accordingly, originally any other user is not provided with an opportunity for participation in the share play in which the user A acts as the host user.

However, if the connection between the information processing apparatus 10a and the information processing apparatus 10b is cut, then although the sharing execution unit 144 maintains the temporary user account of the user C, it is placed into a state in which it can accept participation in the share play from a different user. At this time, the notification unit 128a notifies the members of "Battle Lover," namely, the other members participating in the chat room same as that of the user A, of a message representing that the user A is in a state in which it can perform share play. Consequently, the other members can know that they can participate in the share play of the user A.

In the following, a member screen image of a chat room displayed on the outputting apparatus 4b of the user B is described.

FIG. 27 depicts an example of a member screen image of a chat room. Here, it is assumed that the user B is a member who participates in "Battle Lover" and is the user "MIKE" in FIG. 14. As depicted in the member screen image of FIG. 14, the user B is voice chatting.

In the member screen image displayed to the user B, the time information of the share play item 420 indicates 35 minutes, and this time information does not vary while the connection between the information processing apparatus 10a and the information processing apparatus 10c remains cut. It is to be noted that the time information indicates the carrying out time period of the share play measured by the time measurement unit 164 at the point of time of the cutting of the connection between the information processing apparatus 10a and the information processing apparatus 10c.

Further, in an associated relationship with the information displaying field 404a of the host user, a connection cut mark 409 is added which indicates that share play is in a temporarily stopping state by the cutting of the connection. When compared with FIG. 22, although the share play mark 405 is displayed during the share play, the share play mark 405 is changed to the connection cut mark 409 during temporary stopping of the share play. Consequently, the user B would recognize that the share play is in a temporarily stopping state at present and the user B can participate in the share play.

The user B can cause the participation GUI 440 depicted in FIG. 18 to be displayed by placing the focus frame 402 to the share play item 420 and performing a determination operation. If the user B places the focus frame 402 to the participation GUI 440 and operates the determination button of the inputting apparatus 6b, then the information processing apparatus 10b can transmit a participation request to the information processing apparatus 10a to apply for participation in the share play of the user A.

If the information acquisition unit 142a in the information processing apparatus 10a acquires information indicating that the user B can participate from the information processing apparatus 10b, then the sharing execution unit 144 ends the share play with the user C which has been temporarily stopped and starts share play with the user B. The sharing execution unit 144 discards the user account of the user C when the share play with the user C is ended. Consequently, the measurement value of the time measurement unit 164 by which the carrying out time period of the share play with the user C has been measured is reset, and the time measurement unit 164 starts measurement of the carrying out time period of the share play with the user B.

In this manner, when share play is temporarily stopped in response to cutting of connection, the sharing execution unit 144 accepts participation in the share play from a different user, and if a different user participates, then the sharing execution unit 144 ends the share play with the user C and starts new share play with the different user.

It is to be noted that, before a different user participates, the connection which has been cut between the information processing apparatus 10a and the information processing apparatus 10b may be restored. In this case, the sharing execution unit 144 re-starts the share play between the user A and the user C and does not accept participation of the other user in the share play. The time measurement unit 164 re-starts, when the re-connection is performed, the measurement of the carrying out time period which has been temporarily stopped. Accordingly, the time measurement unit 164 re-starts counting of the timer value, which has been temporarily stopped at 35 minutes, from 35 minutes. In this manner, where share play has been temporarily stopped by a failure in connection, the time measurement unit 164 does not measure the time period within the temporarily stopping period and measures the period within which the connection actually exists as the carrying out time period. Consequently, the guest user can enjoy the share play for the predetermined period of time (60 minutes).

The present invention has been described in connection with the embodiment. This embodiment is illustrative, and it can be recognized by those skilled in the art that various modifications are possible in combination of the components and various processes of the embodiment and also such modifications fall within the scope of the present invention. For example, while, in the embodiment, game software is presented as an example of a content, the content may be a still picture or a moving picture which can be edited by a user operation or may be a movie or the like which allows a user operation for fast feeding or pause.

Further, while it is described in the description of the embodiment that share play is performed only between two users, in the mode of the share screen, sharing of image data among three or more users may be performed. Further, although it is assumed in the present embodiment that, in share play, two users are in chat connection, this is nothing but an explanation taking it as an example that two users are in chat connection as an entry to share play, and the two users who perform share play may not be in chat connection as a premise of this.

In share play, the light emitting unit 85 of the inputting apparatus 6c of the guest user may emit light in a color which differs depending upon the mode of the share play. In the share play 1, the light emitting unit 85 of the inputting apparatus 6c may emit light in a lighting color set by the system software of the information processing apparatus 10c. In the share play 2, since the inputting apparatus 6c behaves as the inputting apparatus 6a of the host user, the light emitting unit 85 of the inputting apparatus 6c may emit light in a lighting color same as that of the light emitting unit 85 of the inputting apparatus 6a. Further, in the share play 3, since the inputting apparatus 6c behaves as an inputting apparatus different from the inputting apparatus 6a in the information processing apparatus 10a of the host user, the light emitting unit 85 of the inputting apparatus 6c may emit light in a lighting color set by the system software of the information processing apparatus 10a.

It is to be noted that, in the share plays 2 and 3, sound data for a player of a game in which the guest user participates may be provided to the information processing apparatus 10c of the guest user. It is to be noted that, in the share play 1, sound data for the host user may be provided to the information processing apparatus 10c.

REFERENCE SIGNS LIST

1 . . . Information processing system, 4 . . . Outputting apparatus, 6 . . . Inputting apparatus, 10 . . . Information processing apparatus, 100a, 100c . . . Processing unit, 102a, 102c . . . Communication unit, 104a, 104c . . . Acceptance unit, 110a . . . System screen image generation unit, 120a, 120c . . . Chat execution unit, 122a, 122c . . . Information acquisition unit, 124a, 124c . . . Member screen image displaying unit, 126a . . . Starting screen image displaying unit, 128a, 128c . . . Notification unit, 140a, 140c . . . Sharing processing unit, 142a, 142c . . . Information acquisition unit, 144 . . . Sharing execution unit, 146a, 146c . . . Notification unit, 148 . . . Message screen image displaying unit, 150 . . . Image data acquisition unit, 152 . . . Reproduction processing unit, 154 . . . Operation data transmission unit, 156 . . . Control right management unit, 158 . . . Operation data provision unit, 160 . . . State acquisition unit, 162 . . . Dialog screen image displaying unit, 164 . . . Time measurement unit, 166 . . . Control data acquisition unit, 168 . . . Control data provision unit, 170a, 170c . . . Content execution unit, 180 . . . Distribution processing unit.

INDUSTRIAL APPLICABILITY

The present invention can be utilized in fields relating to a sharing process of a content image.

The invention claimed is:

1. An information processing apparatus operated by a first apparatus used by a first user and connected to a different information processing apparatus, which is operated by a second apparatus used by a second user, through a network, comprising:
   an execution unit configured to execute a content on the basis of operation information of the first apparatus;
   a sharing processing unit; and
   a distribution processing unit configured to transmit content image data to the different information processing apparatus operated by the second apparatus used by the second user, wherein
   the sharing processing unit includes
   an information acquisition unit configured to acquire operation information of the second apparatus from the different information processing apparatus,
   an operation data provision unit configured to provide the acquired operation information of the second apparatus to the execution unit, such that the execution unit executes the content to achieve a multi-user interactive experience to both the first and second user simultaneously on the basis of the operation information of the first apparatus and the operation information of the second apparatus,
   a control data acquisition unit configured to acquire control data for one or more control target units of the first and second apparatus from the content executed by the execution unit on the basis of the operation information of the second apparatus,
   a control data provision unit configured to provide the control data to the first apparatus or the second apparatus, and
   the control data include light control data, oscillation control data, and audio control data, such that, in response to the control data, at least one of the first and second apparatus produces light, tactile oscillation, and audio to at least one of the first and second user, respectively.

2. The information processing apparatus according to claim 1, wherein the control data provision unit provides the control data to the second apparatus without providing the control data to the first apparatus.

3. The information processing apparatus according to claim 1, wherein the control data provision unit provides the control data to the first apparatus without providing the control data to the second apparatus.

4. An information processing system in which a first information processing apparatus which is operated by a first apparatus used by a first user and a second information processing apparatus which is operated by a second apparatus used by a second user are connected to each other through a network, wherein
   the first information processing apparatus includes
   an execution unit configured to execute a content on the basis of operation information of the first apparatus,
   a sharing processing unit, and
   a distribution processing unit configured to transmit content image data to the second information processing apparatus; and
   the second information processing apparatus includes
   an image data acquisition unit configured to acquire content image data,
   a reproduction processing unit configured to reproduce a content image using the acquired content image data, and
   an operation data transmission unit configured to transmit operation information of the second apparatus to the first information processing apparatus;
   the sharing processing unit including
   an information acquisition unit configured to acquire operation information of the second apparatus from the second information processing apparatus,
   an operation data provision unit configured to provide the acquired operation information of the second apparatus to the execution unit, such that the execution unit executes the content to achieve a multi-user interactive experience to both the first and second user simultaneously on the basis of the operation information of the first apparatus and the operation information of the second apparatus,
   a control data acquisition unit configured to acquire control data for one or more control target units of the first and second apparatus from the content executed by the execution unit on the basis of the operation information of the second apparatus,
   a control data provision unit configured to provide the control data to the first apparatus or the second apparatus, and
   the control data include light control data, oscillation control data, and audio control data, such that, in response to the control data, at least one of the first and second apparatus produces light, tactile oscillation, and audio to at least one of the first and second user, respectively.

5. A control data transmission method for transmitting control data from an information processing apparatus which is operated by a first apparatus used by a first user, comprising:
   executing a content by an execution unit of the information processing apparatus on the basis of operation information of the first apparatus;
   performing a sharing process; and
   transmitting content image data to a different information processing apparatus which is operated by a second apparatus used by a second user,
   wherein the performing a sharing process includes
   acquiring operation information of the second apparatus from the different information processing apparatus,
   providing the acquired operation information of the second apparatus to the execution unit, such that the execution unit executes the content to achieve a multi-user interactive experience to both the first and second user simultaneously on the basis of the operation information of the first apparatus and the operation information of the second apparatus,
   acquiring control data for one or more control target units of the first and second apparatus from the content executed by the execution unit on the basis of the operation information of the second apparatus, and
   providing the control data to the first apparatus or the second apparatus,
   wherein the control data include light control data, oscillation control data, and audio control data, such that, in response to the control data, at least one of the first and second apparatus produces light, tactile oscillation, and audio to at least one of the first and second user, respectively.

6. A non-transitory, computer readable storage medium containing a computer program for causing a computer, which is operated by a first apparatus used by a first user, to carry out actions, comprising:

executing a content by an execution unit of the information processing apparatus on the basis of operation information of the first apparatus;
performing a sharing process; and
transmitting content image data to a different information processing apparatus which is operated by a second apparatus used by a second user,
wherein the performing a sharing process includes
acquiring operation information of the second apparatus from the information processing apparatus,
providing the acquired operation information of the second apparatus to the execution unit, such that the execution unit executes the content to achieve a multi-user interactive experience to both the first and second user simultaneously on the basis of the operation information of the first apparatus and the operation information of the second apparatus,
acquiring control data for one or more control target units of the first and second apparatus from the content executed by the execution unit on the basis of the operation information of the second apparatus, and
providing the control data to the first apparatus or the second apparatus,
wherein the control data include light control data, oscillation control data, and audio control data, such that, in response to the control data, at least one of the first and second apparatus produces light, tactile oscillation, and audio to at least one of the first and second user, respectively.

* * * * *